(12) United States Patent
Santosa et al.

(10) Patent No.: US 8,967,481 B2
(45) Date of Patent: Mar. 3, 2015

(54) SYMBOL-BASED DECODING OF OPTICAL CODES

(71) Applicant: Regents of the University of Minnesota, St. Paul, MN (US)

(72) Inventors: Fadil Santosa, Minneapolis, MN (US); Mark A. Iwen, Durham, NC (US); Rachel A. Ward, Austin, TX (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 13/624,498

(22) Filed: Sep. 21, 2012

(65) Prior Publication Data

US 2013/0068841 A1    Mar. 21, 2013

Related U.S. Application Data

(60) Provisional application No. 61/537,401, filed on Sep. 21, 2011.

(51) Int. Cl.
*G06K 7/10* (2006.01)
*G06K 7/14* (2006.01)

(52) U.S. Cl.
CPC .................................... *G06K 7/1404* (2013.01)
USPC .............. 235/462.1; 235/462.07; 235/462.25; 382/190

(58) Field of Classification Search
USPC .......................... 235/462.1, 462.32, 462, 472; 707/E17.014; 382/190
See application file for complete search history.

(56) References Cited

U.S. PATENT DOCUMENTS

| 5,929,420 A * | 7/1999 | Cai .......................... 235/462.07 |
| 7,024,049 B2 | 4/2006 | Bern et al. |
| 2012/0014604 A1* | 1/2012 | Gaubatz et al. ............... 382/190 |

OTHER PUBLICATIONS

Iwen et al., "A Symbol-based Bar Code Decoding Algorithm," Apr. 25, 2012, 22 pages, http://www.ma.utexas.edu/users/rachel/barcode.pdf.
Bern et al., "Scaner-Model-Based Document Image Improvement," Proceedings, 2000 International Conference on Image Processing, IEEE, Sep. 2000, 582-585.
Choksi et al., "Deblurring of One-Dimensional Bar Codes Via Total Variation Energy Ministation," SIAM J. Imaging Sciences, 3-4, (Oct. 2010), pp. 735-764.
Choksi et al., "Anisotropic Total Variation Regularized L1-Approximation and Denoising/Deblurring of 2D Bar Codes," Inverse Problems and Imaging, 5 (Aug. 2011), 591-617.

(Continued)

*Primary Examiner* — Thien M Le
*Assistant Examiner* — Asifa Habib
(74) *Attorney, Agent, or Firm* — Shumaker & Sieffert, P.A.

(57) ABSTRACT

Techniques and systems for decoding optical codes using symbol-based algorithms are described. In one example, a method includes acquiring a signal representative of light reflected from an optical code comprising one or more symbols of a finite set of symbols and applying a decoding model to the signal. The decoding model may relate measured signals to the finite set of symbols, such that each of the symbols of the finite set of symbols are associated with a respective encoded character of a finite set of encoded characters. The method may also include determining, by a processor, a sequence of one or more of the encoded characters based on the application of the decoding model to the signal. In this manner, the optical code may be decoded by directly fitting an acquired signal from the optical code to possible symbols within the optical code and the associated encoded characters.

22 Claims, 13 Drawing Sheets

(56) References Cited

OTHER PUBLICATIONS

Dumas et al., "An Evolutionary Approach for Blind Deconvolution of Barcode Images with Nonuniform Illumination," IEEE Congress on Evolutionary Computation, Jun. 2011, 2423-2428.

Dutta et al., "Low-Frequency Fluctuations in Solids: 1/f Noise," Rev. Mod. Phys., 53-3 (Jul. 1981), 497-516.

Esedoglu, "Blind Deconvolution of Bar Code Signals," Inverse Problems, 20 (2004), 121-135, Nov. 21, 2003.

Esedoglue et al., "Error Estimates for a Bar Code Reconstruction Method," Discrete and Continuous Dynamical Systems B, vol. 17, No. 6, Sep. 2012, pp. 1889-1902.

Kim et al., "Joint Nonuniform Illumination Estimation and Deblurring for Bar Code Signals," Optic Express, 15-22 (Oct. 25, 2007), 14817-14837.

Modica et al., "Un Esempio Di L-Convergenza," Boll. Un. Mat. Ital., 5-14 (1994), 285-299.

Marom et al., "Speckle revisited—Analysis of Speckle Noise in Bar-Code Scanning Systems," J. Opti. Soc. Am., 18 (2001), 888-901.

\* cited by examiner

SYMBOL-BASED DECODING OF OPTICAL CODES

This application claims the benefit of U.S. Provisional Patent Application No. 61/537,401, filed Sep. 21, 2011, which is hereby incorporated by reference in its entirety.

STATEMENT REGARDING FEDERALLY SPONSORED RESEARCH

This invention was made with government support under Agency Grant No.: 0807856 awarded by the National Science Foundation. The government has certain rights in the invention.

TECHNICAL FIELD

The invention relates to machine-readable visual representations of information such as bar codes, and more specifically, decoding the visual representations to acquire information.

BACKGROUND

Information is commonly provided as a visual or optical representation. Symbols such as text, numbers, or one or more shapes may be provided in print form or otherwise displayed to convey the information that these symbols represent. For example, bar codes are ubiquitously printed on or otherwise affixed to items as a mechanism for conveying information with respect to item on which it printed. In particular, a bar code is a coded pattern of graphical indicia, typically in the form of a matrix or series of bars and spaces of varying widths. The bar code provides, as one example, an optical machine-readable representation of the information.

SUMMARY

This disclosure describes techniques for decoding signals representative of optical codes. The decoding technique may generally be described as a symbol-based technique in which a decoding model is used to fit an acquired signal from an optical code to one or more symbols expected in the optical code. An optical code, e.g., a one-dimensional or two-dimensional bar code, may be generated using several symbols selected from a finite set of symbols. Each of the symbols may represent a character (e.g., a number, letter, or other information).

Once a signal is generated from light reflected off of a target optical code, for example, the signal may be acquired for decoding. A decoding model, based on the type of optical code targeted, is the applied to the acquired signal to fit the acquired signal to one or more of the possible symbols. For example, the decoding model may include a greedy algorithm developed for the type of optical code targeted. Based on the best fit of the acquired signal to the possible symbols, the likely symbols of the target optical code are determined. The encoded characters represented by the likely symbols of the target optical code can then be determined for use by another system and/or presentation to a user.

In one example, the disclosure describes a method that includes acquiring a signal representative of light reflected from an optical code comprising one or more symbols of a finite set of symbols, applying, by a processor, a decoding model to the signal, wherein the decoding model relates measured signals to the finite set of symbols, each of the symbols of the finite set of symbols associated with a respective encoded character of a finite set of encoded characters, and determining, by the processor, a sequence of one or more of the encoded characters based on the application of the decoding model to the signal.

In another example, the disclosure describes a computing system that includes a decoding module configured to acquire a signal representative of light reflected from an optical code comprising one or more symbols of a finite set of symbols, apply a decoding model to the signal, wherein the decoding model relates measured signals to the finite set of symbols, each of the symbols of the finite set of symbols associated with a respective encoded character of a finite set of encoded characters, and determine a sequence of one or more of the encoded characters based on the application of the decoding model to the signal.

In another example, the disclosure describes a computer-readable storage medium comprising instructions that, when executed, cause one or more processors to acquire a signal representative of light reflected from an optical code comprising one or more symbols of a finite set of symbols, apply a decoding model to the signal, wherein the decoding model relates measured signals to the finite set of symbols, each of the symbols of the finite set of symbols associated with a respective encoded character of a finite set of encoded characters, and determine a sequence of one or more of the encoded characters based on the application of the decoding model to the signal.

The details of one or more examples of the invention are set forth in the accompanying drawings and the description below. Other features, objects, and advantages of the invention will be apparent from the description and drawings, and from the claims.

DETAILED DESCRIPTION

Figure 1:
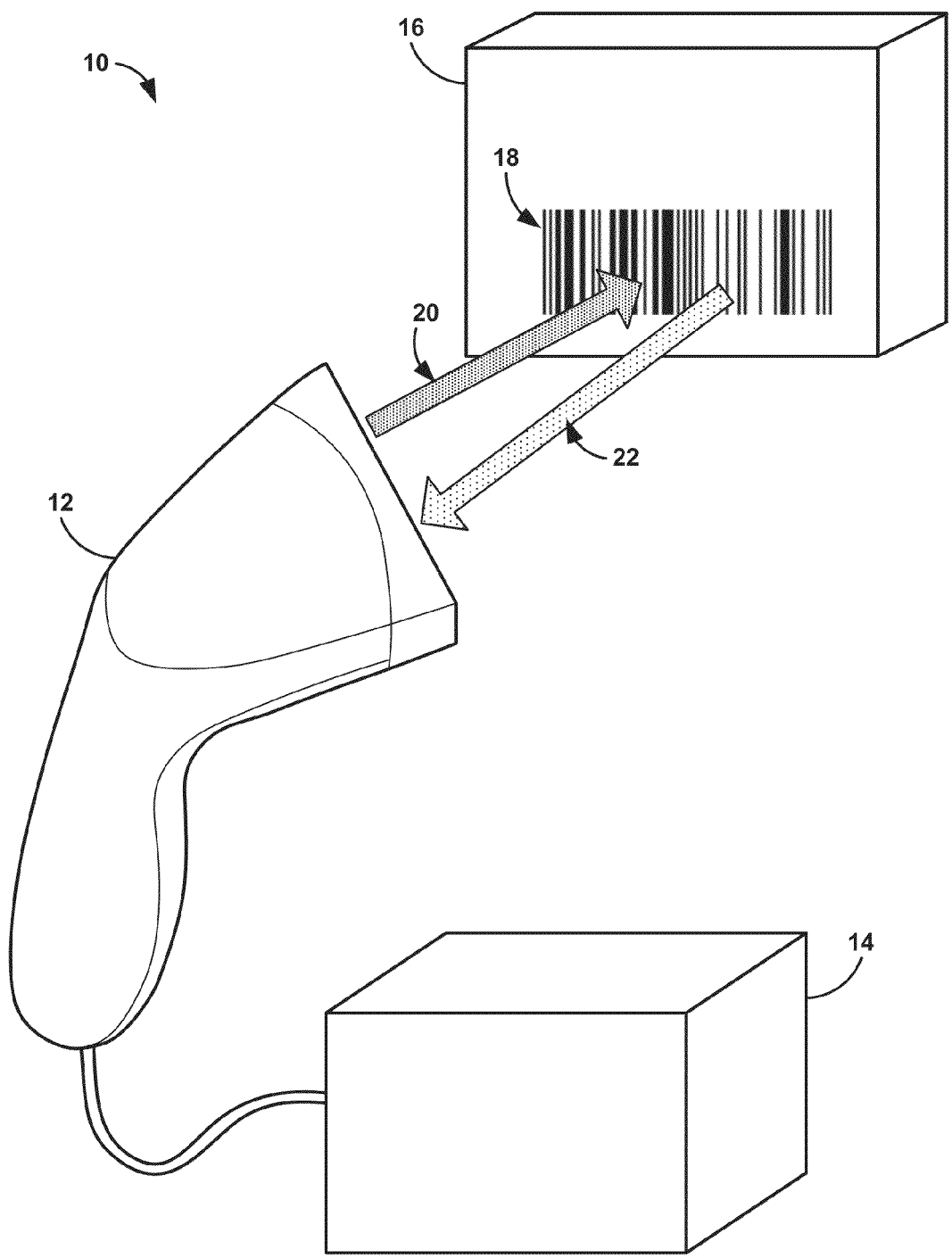
FIG. 1 is a conceptual diagram illustrating an example system configured to obtain a representation of an optical code and decode the representation using a symbol-based decoding technique.

This disclosure describes techniques and systems for symbol-based decoding of optical codes and other visual representations of information. Optical codes are generally one- or two-dimensional codes (e.g., bar codes or quick response (QR) codes) that encode information by representing the information as a series or pattern of symbols (e.g., lines, rectangles, squares, letters, numbers, or any other shapes). To obtain information encoded by the optical codes, a system must generate a signal from the optical code and analyze the signal to identify the optical code and decode the optical code to obtain the encoded information.

In the example of one-dimensional bar codes, information is typically encoded by representing the information using a series of black and white bars of varying widths. A look-up table is used to convert the bar widths to the encoded information. A laser scanner may be used to obtain a blurred and noisy image of the bar code in the form of a time series signal. These bar code scanners estimate the width of each of the bars from the signal and then use the look-up table to decode the information. When a camera-based scanner is used to scan bar codes, an under-resolved and blurred image is typically obtained from the bar code. A system may then use this degraded image to estimate bar widths and decode the information from the estimated bar widths.

Decoding of optical codes, such as a bar code for example, is typically viewed as a problem of blind deconvolution of a binary image in which the blurring kernel contains unknown parameters which must be estimated from the signal. In other words, typical decoding of optical codes may involve obtaining a signal or data representative of the optical code and analyzing the obtained signal in an attempt to quantify the parameters of symbols or elements of the optical code (e.g., the dimensions of each bar of the bar code). From these quantified parameters of the signal, the decoding process may attempt to extract the encoded information from the parameters. Since the obtained signal that represents the optical code inherently includes noise due to the acquisition of the signal, there may be error in the intermediate step of quantifying the parameters of the symbols of the optical code. This error may be multiplied during the next step of deriving the encoded information from the symbols.

Rather than formulating the inverse problem as one of binary image reconstruction, the techniques described herein may address the problem of decoding optical codes as one of determining the unknown code directly from the signal. Since each optical code may include a series or pattern of symbols, this technique may be referred to as a symbol-based decoding technique. This symbol-based approach may have the benefit of incorporating the symbology of the bar code, which may reduce the degrees of freedom in the problem (e.g., eliminate the intermediate step of reconstructing the optical code image and/or estimating dimensions of elements of the optical code). In other words, the symbol-based technique described herein may be more reliable and robust for decoding optical code, particularly in situations in which acquired signals represented by the optical codes are highly corrupted and/or optical scanning takes place in less than ideal situations that produce higher levels of noise.

As described herein, symbol-based algorithms may determine the encoded information directly from an obtained signal from an optical code (e.g., one- or two-dimensional optical codes), without first estimating the dimensions of elements within the optical code such as black and white bars of a bar code. The symbol-based technique may include a greedy algorithm developed for the specific type of targeted bar code, such as a Universal Product Code (UPC) bar code. The symbol-based algorithm may integrate a look-up table as a dictionary of possible encoded characters associated to potential symbols expected in the optical code. From the signal or image obtained from the optical code, the symbol-based algorithm may exploit the symbology of optical codes (i.e., the language of the code) to produce the likeliest sequence of symbols, and their associated encoded characters, that fit the signal or image. In this manner, the symbol-based approach to optical code decoding may be insensitive to noise in the obtained signal and to other unknown parameters of a scanning device.

In some examples, the symbol-based approach may also include an edge detection technique to further reduce any noise in the obtained signal. The edge detection technique may rely on known parameters of the start and end segments to the particular type of optical code targeted by a scanner. In other words, the edge detection technique may use known optical code function for a particular type of optical code to solve for one or more unknown parameters prior to applying the remainder of the symbol-based technique (e.g., the greedy algorithm) to the obtained signal. These known parameters may reduce noise from the signal and further increase accuracy of the fit of the obtained signal to the one or more possible symbols.

FIG. 1 is a conceptual diagram illustrating an example system 10 configured to obtain a representation of optical code 18 and decode the representation using a symbol-based decoding technique. As shown in FIG. 1, system 10 may include a scanner 12 and computing system 14. Product 16 may include optical code 18 (e.g., a bar code) printed, embossed, or otherwise placed on a visible surface of product 16. System 10 may be used to obtain information about product 16 by capturing a representation of optical code 18 and decoding the information contained in the representation.

Scanner 12 may be a hand-held scanner that includes a laser (or other light emitting device) configured to emit light 20 in the direction of optical code 18. Reflected light 22 from optical code 18 may return to scanner 12 and be detected by an optical sensor within scanner 12. Although scanner 12 may be a laser scanner, scanner 12 may be any device that emits light 20 and detects light 22 or any device that merely detects ambient light 22 from optical code 18. Optical code 18 may be configured as a one-dimensional optical code (e.g., a bar code) or a two-dimensional code. Optical code 18 may be any representation of information that includes a standardized set of symbols to encode the information, for example.

The optical sensor within scanner 12 may then generate a signal representative of light 22 reflected from optical code 18. The signal may be a time-based signal generated by the reflection of laser light to optical code 18 or any other signal representative of the image of optical code 18. In some examples, the obtained signal may be a combination of two or more signals used to represent optical code 18. Computing system 14 may be configured to acquire the signal from scanner 12 for decoding the signal. Although computing system 14 is shown as physically coupled to scanner 12 via a cable, scanner 12 may include computing system 14 within the housing of scanner 12 in other examples. Alternatively, scanner 12 may wirelessly transmit the signal to a separate computing system 14 that may be located local to scanner 12 or remote from scanner 12. For example, computing system 14 may be a wireless module carried by an operator of scanner 12. In other examples, computing system 14 may be a server or other networked computing system in communication with scanner 12 via one or more networks.

Computing system 14 may include any hardware, firmware, or software necessary to acquire the signal representative of optical code 18 and decode the signal using a symbol-based decoding technique described herein. The symbol-based decoding technique may include a decoding model used to fit the acquired signal from optical code 18 to one or more symbols expected in the optical code. In other words, optical code 18 may include one or more symbols from a finite set of symbols, where each of the symbols may represent a character (e.g., a number, letter, or other information). In this manner, the symbol-based decoding technique applied by computing system 14 to the signal may be tailored to the specific type of optical code 18 (e.g., a UPC bar code or QR code). Since the signal may only be representative of some combination of these known finite symbols, computing system 14 limits the potential results of the signal to the finite set of symbols to reduce error in the decoding process.

Computing system 14 may then apply a decoding model, based on the type of optical code 18, to the acquired signal. Computing system 14 may thus fit the acquired signal to one or more of the possible symbols contained in the optical code 18. The decoding model may include a greedy algorithm developed for the type of optical code targeted. Based on the best fit of the acquired signal to the possible symbols, the likely symbols of optical code 18 may be determined. Computing system 14 may then determine the encoded characters represented by the likely symbols of optical code 18 and transmit the characters, or sequence of characters, to another system, present the characters to a user, or use the characters to obtain additional data for the user. In this manner, computing device 14 may be configured to decode optical codes, with minimal error, to identify items, track items, or otherwise obtain information.

In one example, computing system 14 may be configured to acquire a signal representative of light 22 reflected from optical code 18 comprising one or more symbols of a finite set of symbols. Computing system 14 may also be configured to apply a decoding model to the signal, wherein the decoding model relates measured signals to the finite set of symbols, each of the symbols of the finite set of symbols associated with a respective encoded character of a finite set of encoded characters, and determine a sequence of one or more of the encoded characters based on the application of the decoding model to the signal. Light 22 may be obtained by an optical sensor configured to generate a signal representative of light 22.

The decoding model may be part of the symbol-based decoding process. Computing system 14 may be configured to apply the decoding model such that the decoding model is iteratively applied, for each of the symbols of the finite set of symbols of the optical code 18, the decoding model to the acquired signal until each portion of the signal has been matched to a respective symbol. In other words, computing system 14 may use the decoding model to search the signal for portions of the signal which correspond or relate to respective symbols. Computing system 14 may, as an example, apply one of the symbols of the finite set of symbols to the signal and determine the fit of the symbol to each portion of the signal. Computing system 14 may continue this process for each of the symbols and then select the sequence of symbols that best fits the acquired signal. Alternatively, computing device 14 may iteratively cycle through each of the possible symbols for a portion of the signal and then move on to cycle through the next portion of the signal until the best fit symbols are selected for each portion of the signal.

The decoding model may include a lookup table that matches the measured signals (i.e., potentially measured signals) to a respective symbol of the finite set of symbols and a respective character encoded by the respective symbol. For example, the lookup table may match possible signals to corresponding symbols of the finite set of symbols. In addition, each of the symbols may correspond to a respective character that has been encoded by the corresponding symbol. By this transitive property of the lookup table, the signal can be directly matched to the encoded characters through the symbols of the optical code.

As described herein, the decoding model used to decode the signal may include a greedy algorithm. Computing system 14 may be configured to apply the greedy algorithm to the signal to identify the sequence of the encoded characters represented by the symbols of the optical code. The greedy algorithm may enable the selection of symbols that best fit the acquired signal from the optical code. In some examples, prior to applying the decoding model to the signal, an edge detection technique may be applied to reduce noise from the acquired signal. Computing system 14 may estimate unknown parameters of an equation representing the acquired signal to remove noise from the acquired signal and detect edges of the symbols of the optical code. Estimating unknown parameters of the equation may include solving for the unknown parameters using an equation that represents a format of the optical code. In other words, if the type of optical code is known, a function representing the code can be applied to the detected signal function to solve for unknown parameters (e.g., potential noise in the signal).

As will be further described herein, the optical code may be a bar code. The decoding model may represent a map between the bar code and the observed data (e.g., the acquired signal) as a matrix. In addition, the decoding model may include a barcode dictionary that relates signals representative of the bar code to the symbols of the bar code. For example, the barcode dictionary may be embodied as a block diagonal matrix (or one or more matrices). These matrices may also be used for optical codes other than bar codes. In some examples, application of the decoding model may include one or more approximations for unknown parameters of the decoding model, such as using an approximate for $\alpha G(\sigma)$.

Although the symbol-based decoding techniques described herein are described with respect to one-dimensional bar codes and laser scanners such as those illustrated in FIG. 1, these symbol-based decoding techniques may be applied to any one- or two-dimensional (and black and white, grayscale, and/or color) optical codes and any type of optical sensor configured to generate a representation of the optical code. In this manner, the symbol-based techniques described herein may be used to decode signals from optical codes such as UPC bar codes or QR codes. In addition, the symbol-based techniques may even be used to identify and decode signals representative of text (e.g., characters from any language), numbers, or any shapes that could be included in the dictionary associated with the symbol-based decoding technique.

Figure 2:
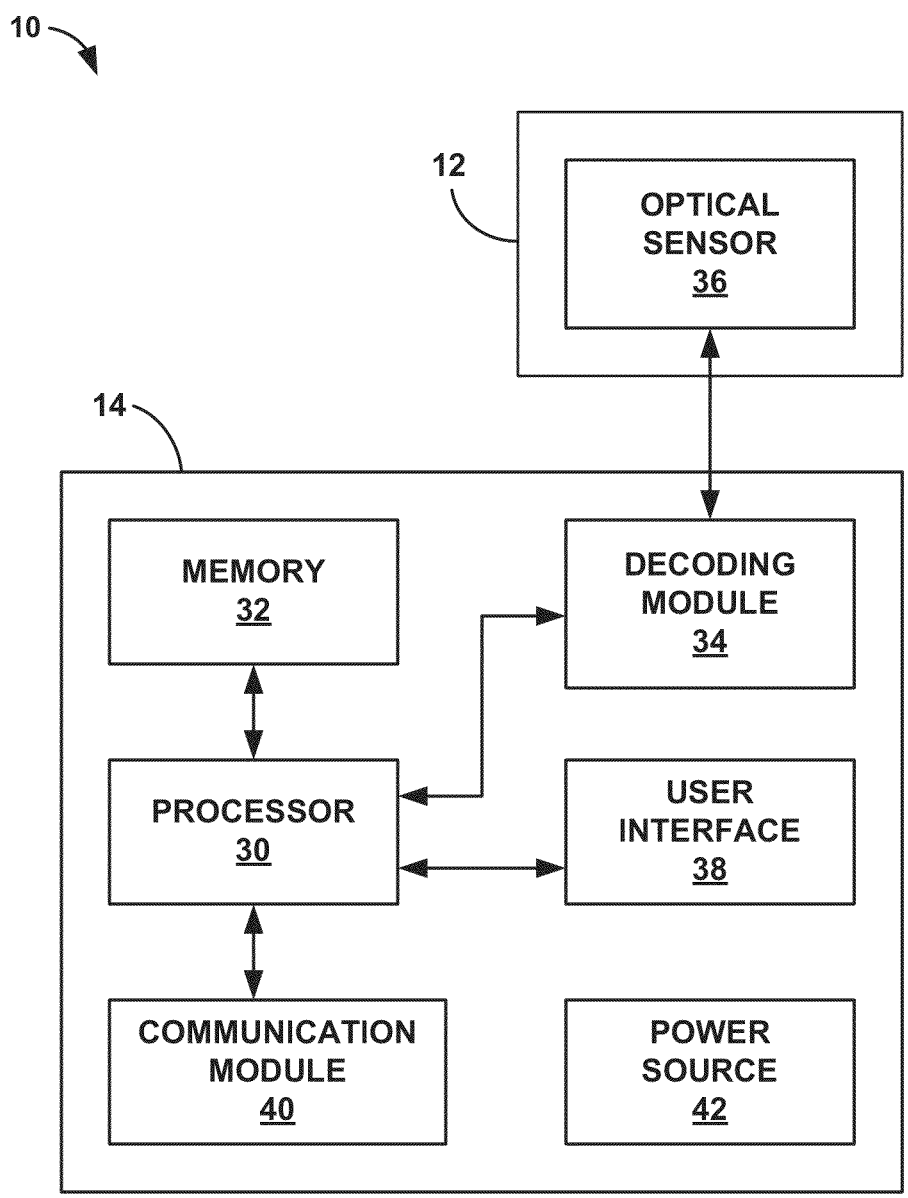
FIG. 2 is a block diagram illustrating an example system configured to decode an obtained representation of an optical code using a symbol-based decoding technique.

FIG. 2 is a block diagram illustrating further details of the example system 10 of FIG. 1 that is configured to decode an obtained representation of an optical code using a symbol-based decoding technique. In the example of FIG. 2, system 10 includes computing system 14 and scanner 12 of FIG. 1. Scanner 12 includes optical sensor 36. Computing system 14 includes, for example, one or more processors 30, memory 32, decoding module 34, user interface 38, communication module 40, and power source 42. In other examples, computing system 14 may include a greater or fewer number of components.

In general, computing system 14 may comprise any suitable arrangement of hardware, alone or in combination with software and/or firmware, to perform the various techniques described herein attributed to computing system 14 and processor 30 for acquiring a signal representative of an optical code and decoding the signal. In various examples, computing system 14 may include one or more processors 30, such as one or more microprocessors, digital signal processors (DSPs), application specific integrated circuits (ASICs), field programmable gate arrays (FPGAs), or any other equivalent integrated or discrete logic circuitry, as well as any combinations of such components. Computing system 14 also, in various examples, may include a memory 32, such as random access memory (RAM), read only memory (ROM), programmable read only memory (PROM), erasable programmable read only memory (EPROM), electronically erasable programmable read only memory (EEPROM), flash memory, comprising executable instructions for causing the one or more processors to perform the actions attributed to them. Moreover, although processor 30, memory 32, decoding module 34, optical sensor 36, user interface 38, and communication module 40 are described as separate modules, in some examples, two or more of these components may be functionally integrated. In some examples, processor 30, decoding module 34, and communication module 40 correspond to individual hardware units, such as ASICs, DSPs, FPGAs, or other hardware units.

Memory 32 may be configured to store one or more decoding models for one or more types of optical codes. Memory 32 may also store one or more algorithms for determining one or more unknown parameters for detecting the edges of the symbols of optical codes or any other parameters, equations, or matrices required to decode an acquired signal from an optical code. In addition, memory 32 may be configured to store sequences or patterns of decoded characters for one or more optical codes scanned by system 10. Processor 30 may present these sequences of decoded characters to a user via user interface 38, use the sequences to generate or acquire additional information, and/or transmit the sequence to another computing device via communication module 40.

Decoding module 34 may be configured to acquire the signal representative of the target optical code from optical sensor 36. Decoding module 34 may then perform symbol-based decoding of the signal using the decoding model for the type of optical code targeted by scanner 12. Decoding module 34 may be configured to perform any step or function of the decoding techniques described herein for determining encoded characters or information from a signal representative of a target optical code. Decoding module 34 may retrieve decoding models, parameters values, or any other information stored in memory 32 for decoding the optical code signal. In other examples, processor 30 may perform part or all of these functions attributed to decoding module 34. In some examples, decoding module 34 may include software executing on one or more processors 30 of system 14. Alternatively, one or more steps of the decoding technique may be distributed between computing system 14 and one or more additional computing systems.

User interface 38 may include any input and/or output devices configured to allow a user to communicate with computing system 14. For example, user interface 38 may include a display, lights, a keypad, a touch-sensitive screen, or any other mechanisms. Communication module 40 may support any wired and/or wireless communication protocol for transmitting and/or receiving data from another computing device or system. For example, communication module 40 may support transmission of data, such as decoded characters of an optical code, over a wired or wireless network. Power source 42 may include any rechargeable or non-rechargeable power source configured to enable operation of computing system 14.

Figure 3A:
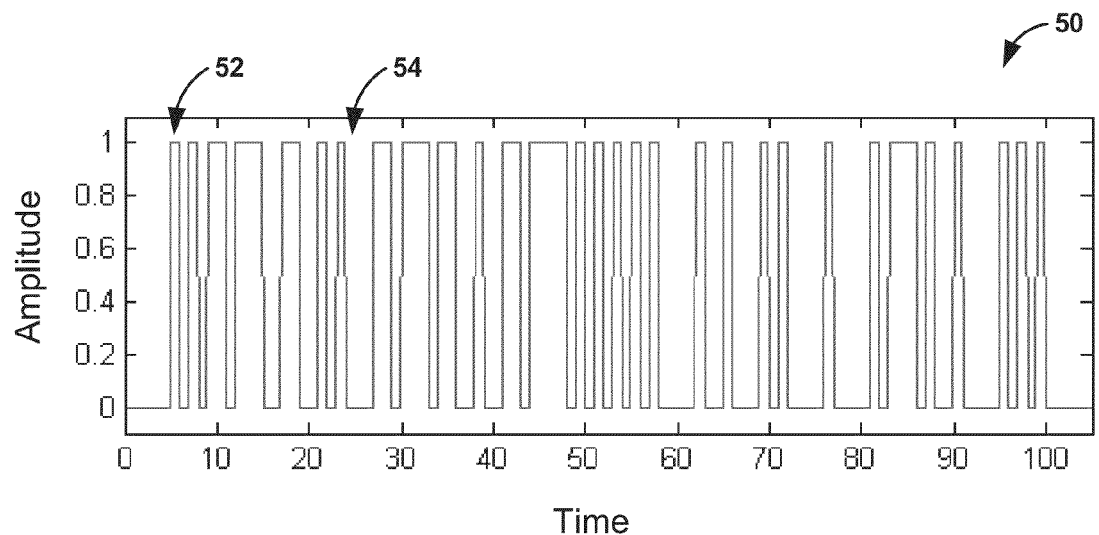
FIGS. 3A and 3B illustrate an example binary bar code function and a corresponding example Universal Product Code bar code, respectively.
Figure 3B:
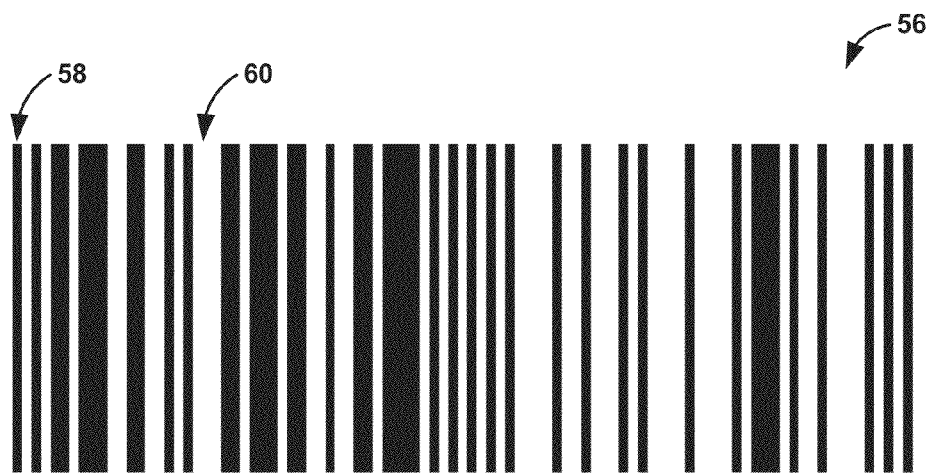

FIGS. 3A and 3B illustrate an example binary bar code function and a corresponding example Universal Product Code bar code, respectively. In the example of FIGS. 3A and 3B, a bar code is scanned by shining a narrow laser beam which moves across the bar code at constant speed. The amount of light reflected as the beam moves is recorded and can be viewed as signal in time. Since the example bar code 56 consists of black segments 58 and white segments 60, the reflected energy will be large when the beam is on the white part, and small when it is on the black part. The beam intensity on the bar code can be approximated by a Gaussian, although other intensity profiles may be considered. The reflected energy during the scan can be modeled as a convolution of a Gaussian function with the bar code image intensity. The recorded data are samples of the resulting continuous time signal. Other mechanisms may be used for imaging the bar code, such as one dimensional and two dimensional cameras.

The Gaussian beam intensity can be writing as a function of time t:

$$g(t) = \alpha \frac{1}{\sqrt{2\pi}\,\sigma} \exp - \frac{t^2}{2\sigma^2}. \tag{1}$$

There are two parameters: (i) the variance $\sigma^2$ and (ii) the constant multiplier $\alpha$. Time can be related to the actual position of the laser beam on the bar code, which is measured in distance. By ignoring this relationship we can represent the bar code as a function of time.

Thus, let z(t) be the bar code. Since it represents a black and white image, we will normalize it to be a binary function. Then the sampled data can be represented as:

$$d_i = \int g(t_i - \tau) z(\tau) d\tau + h_i, i \in [m], \tag{2}$$

where $t_i \in [0,n]$ are equally spaced discretization points, and where $h_i$ is the noise associated with the scanning. We have used the notation $[m] = \{1, 2, \ldots, m\}$. We need to consider the relative size of the laser beam spot to the width of the narrowest bar in the bar code. Setting the minimum bar width to be 1 in the artificial time measure, the width of the Gaussian is $2\sqrt{2\ln 2}\sigma$. The width of the Gaussian is defined as interval over which the Gaussian is greater than half its maximum amplitude.

Next we explain the roles of the parameters in the Gaussian. The variance models the distance from the scanner to the bar code (bigger distance means bigger variance). The multiplier $\alpha$ lumps the conversion from light energy interacting with a binary bar code image to the measurement. Since the distance to the bar code is unknown and the intensity-to-voltage conversion depends on ambient light and properties of the laser/detector, these parameters are assumed to be unknown.

To develop the model further, consider the characteristic function:

$$\chi(t) = \begin{cases} 1 & \text{for } 0 \le t \le 1, \\ 0 & \text{else.} \end{cases}$$

The bar code function can be written as:

$$z(t) = \sum_{j=1}^{n} c_j \chi(t - (j-1)). \tag{3}$$

The coefficients $c_j$ are either 0 or 1. The sequence $$c_1, c_2, \ldots, c_n,$$

represents the information coded in the bar code. In the UPC symbology, the digit 4 would be represented by a sequence 0100011. This is to be interpreted as a white bar of unit width, followed by a black bar of unit width, followed by a white bar of 3 unit widths, and ended with a black bar of two unit widths. The number n is fixed for UPC bar codes and is equal to 95 for a 12-digit code (further explanations in the subsequent). One can think of the sequence $\{c_1, c_2, \ldots, c_n\}$ as an instruction for printing a bar code. Every $c_j$ is a command to lay out a white bar if $c_j=0$, or a black bar if otherwise. Graph 50 of FIG. 3A is an illustration of an example signal representing bar code 56, wherein peaks 52 correspond to black segments 58 and valleys 54 correspond to white segments 60. Black segments 58 and/or white segments 60 may be considered as symbols of bar code 56.

Substituting this representation back in (2), we get:

$$d_i = \int g(t_i - t) \left[ \sum_{j=1}^{n} c_j \chi(t - (j-1)) \right] dt + h_i$$

$$= \sum_{j=1}^{n} \left[ \int_{(j-1)}^{j} g(t_i - t) \, dt \right] c_j + h_i.$$

In terms of the matrix $G=G(\sigma)$ with entries:

$$G_{kj} = \frac{1}{\sqrt{2\pi}\sigma} \int_{(j-1)}^{j} e^{-\frac{(t_k-t)^2}{2\sigma^2}} dt, \quad k \in [m], j \in [n], \tag{4}$$

this bar code determination problem now reads:

$$d = \alpha\,G(\sigma)c + h. \tag{5}$$

Figure 4:
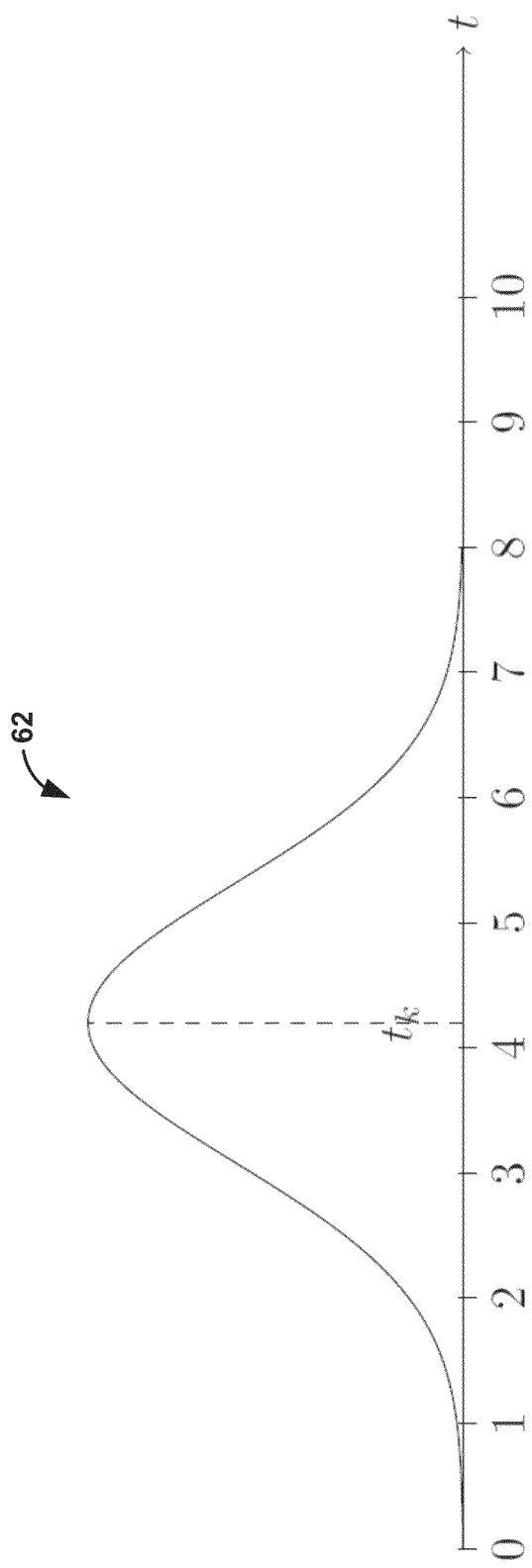
FIG. 4 is an example Gaussian distribution placed over a bar code grid to calculate a matrix element.

FIG. 4 is an example Gaussian distribution placed over a bar code grid to calculate a matrix element. As shown in FIG. 4, the calculation of the matrix element $G_{kj}$ can be done by placing a scaled Gaussian 62 over the bar code grid and integrating over each of the bar code intervals.

The over-sampling ratio can be defined as $r=m/n$ (recall that m is the number of time samples). As r increases, meaning that the number of time samples per bar width increases, or equivalently as the time samples become smaller in comparison to the minimum bar width, G becomes more and more over-determined and the columns of G become more linearly dependent. For specifically, G is nearly block-diagonal matrix with blocks of size$\approx r \times 1$. One challenge in solving (5) directly for c, $\sigma$ and $\alpha$ is that c is a binary vector, while the Gaussian parameters are continuous variables.

Figure 5:
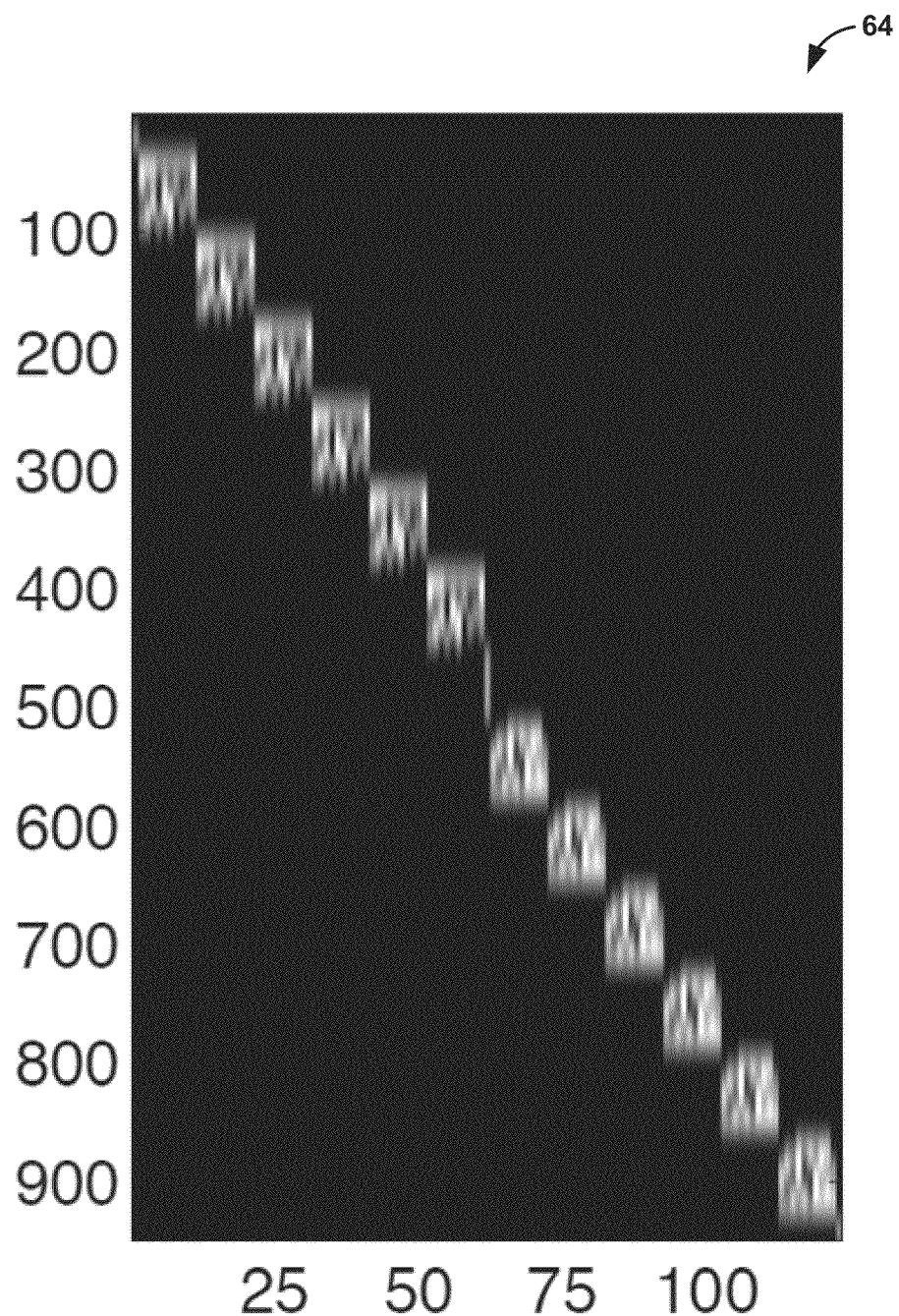
FIG. 5 is an example bar code forward map representative of the bar code and observed data.

FIG. 5 is an example bar code forward map 54 representative of the bar code and observed data. Bar code forward map 54 may represent the observed data, or acquired signal, in relation to the bar code.

One embodiment tailors the bar code reading model specifically for UPC bar codes. The method can be applied to other bar code symbologies such as EAN, Code 128, PDF 417. In the UPC-A symbology, a bar code represents a 12-digit number. If we ignore the check-sum requirement, then any 12-digit number is permitted, and the number of unit widths, n, is fixed to 95. Going from left to right, the UPC bar code has 5 parts—the start sequence, the codes for the first 6 digits, the middle sequence, the codes for the next 6 digits, and the end sequence. Thus the bar code has the following structure:

$$SL_1L_2L_3L_4L_5L_6MR_1R_2R_3R_4R_5R_6E,$$

where S, M, and E are the start, middle, and end patterns respectively, while $L_i$ and $R_i$ are patterns corresponding to the digits.

In the sequel, we represent a white bar of unit width is by 0, and black bar by 1, as in sequence $\{ci\}$ $\{c_{ij}\}$ in the bar code representation (3). The start, middle, and end patterns are $$S = E = [101], M = [01010].$$

The patterns for $L_i$ and $R_i$ are taken from the following table:

| digit | L-pattern | R-pattern | |
|---|---|---|---|
| 0 | 0001101 | 1110010 | (6) |
| 1 | 0011001 | 1100110 | |
| 2 | 0010011 | 1101100 | |
| 3 | 0111101 | 1000010 | |
| 4 | 0100011 | 1011100 | |
| 5 | 0110001 | 1001110 | |
| 6 | 0101111 | 1010000 | |
| 7 | 0111011 | 1000100 | |
| 8 | 0110111 | 1001000 | |
| 9 | 0001011 | 1110100 | |

Note that the right patterns are just the left patterns with the 0's and 1's flipped. As can be seen from this construction, the bar code can be represented as a binary vector $c \in \{0,1\}^{95}$ $\{0,1\}95$. However, not every binary vector constitutes a bar code—only $10^{12}$ out of the total $2^{95}$, or approximately $2.5 \times 10^{-17}$% of binary vectors are bar codes. Thus the unknown in our inverse problem is a finite state, with a small number of possible states.

We exploit all of this information in our decoding algorithm. To start, we realize that bar codes have a sparse representation in the following bar code dictionary. We write the left-integer and right-integer codes as columns of a 7-by-10 matrix, $$L = \begin{bmatrix} 0 & 0 & 0 & 0 & 0 & 0 & 0 & 0 & 0 & 0 \\ 0 & 0 & 0 & 1 & 1 & 1 & 1 & 1 & 1 & 0 \\ 0 & 1 & 1 & 1 & 0 & 1 & 0 & 1 & 1 & 0 \\ 1 & 1 & 0 & 1 & 0 & 0 & 1 & 1 & 0 & 1 \\ 1 & 0 & 0 & 1 & 0 & 0 & 1 & 0 & 1 & 0 \\ 0 & 0 & 1 & 0 & 1 & 0 & 1 & 1 & 1 & 1 \\ 1 & 1 & 1 & 1 & 1 & 1 & 1 & 1 & 1 & 1 \end{bmatrix},$$

$$R = \begin{bmatrix} 1 & 1 & 1 & 1 & 1 & 1 & 1 & 1 & 1 \\ 1 & 1 & 1 & 0 & 0 & 0 & 0 & 0 & 0 & 1 \\ 1 & 0 & 0 & 0 & 1 & 0 & 1 & 0 & 0 & 1 \\ 0 & 0 & 1 & 0 & 1 & 1 & 0 & 0 & 1 & 0 \\ 0 & 1 & 1 & 0 & 1 & 1 & 0 & 1 & 0 & 1 \\ 1 & 1 & 0 & 1 & 0 & 1 & 0 & 0 & 0 & 0 \\ 0 & 0 & 0 & 0 & 0 & 0 & 0 & 0 & 0 & 0 \end{bmatrix}.$$

The start and end patterns, S and E, are 3-dimensional vectors, while the middle pattern M is a 5-dimensional vector $$S = E = [010]^T, M = [01010]^T$$

The bar code dictionary is the 95-by-123 block diagonal matrix $$\mathcal{D} = \begin{bmatrix} S & 0 & \cdots & & & & & & \cdots & 0 \\ 0 & L & & & & & & & & \vdots \\ \vdots & & L & & & & & & & \\ & & & L & & & & & & \\ & & & & L & & & & & \\ & & & & & L & & & & \\ & & & & & & L & & & \\ & & & & & & & M & & \\ & & & & & & & & R & \\ & & & & & & & & & R \\ & & & & & & & & & & R \\ & & & & & & & & & & & R \\ & & & & & & & & & & & & R & \vdots \\ \vdots & & & & & & & & & R & 0 \\ 0 & \cdots & & & & & & & \cdots & 0 & E \end{bmatrix}.$$

Any bar code c can be expanded in the bar code dictionary with respect to D as $$c = Dx, x \in \{0,1\}^{123}, \quad (7)$$

where $x \in \{0,1\}^{123}$ has a very special structure:
1. The 1st, 62nd and the 123rd entries of x, corresponding to the S, M, and E patterns, are 1.
2. Among the 2nd through 11th entries of x, one and only one entry—the entry corresponding to the first digit in $c = Dx$—is nonzero. The same is true for 12th through 22nd entries, etc., until the 61st entry. This pattern starts again from the 63rd entry through the 122th entry. In all, x has exactly 15 nonzeroes.

That is, if $v_j$, for $j=1,\ldots,12$, are vectors in $\{0,1\}^{10}$ of sparsity 1, then x must take the form $$x^T = [1, v_1^T, \ldots, v_6^T, 1, v_7^T, \ldots, v_{12}^T, 1], \quad (8)$$

We now consider the problem of UPC decoding with a noisy input. Incorporating this new representation, the bar code determination problem (5) becomes $$d = \alpha \mathcal{G}(\sigma) \mathcal{D} x + h, \quad (9)$$

where the matrices $\mathcal{G}(\sigma) \in \mathbb{R}^{m \times 95}$ and $\mathcal{D} \in \{0,1\}^{95 \times 123}$ are as defined in (4) and (7) respectively, and $h \in \mathbb{R}^m$ is additive noise. Note that G will generally have more rows than columns, while D has fewer rows than columns. Given the data $d \in \mathbb{R}^m$, our objective is to return the bar code solution $x \in \{0,1\}^{123}$ reliably and as quickly as possible.

We now examine the properties of the map between a bar code c and the data. This map is represented by the matrix $P = \alpha G(\sigma) D \in \mathbb{R}^{m \times 123}$. Based on the structure of D it makes sense to partition $P = P(\alpha, \sigma)$ as the forward map. Based on the block-diagonal structure of the bard code dictionary D, it may make sense to partition P as $$P = [p^{(1)} p^{(2)} \ldots p^{(15)}]. \quad (10)$$

The 1st, 8th, and 15th submatrices are special as they correspond to the start, middle, and end sequence of the bar code. Recalling the structure of x, they must be column vectors of length m which we write as $$P^{(1)} = p_1^{(1)}, P^{(8)} = p_1^{(8)}, \text{ and } P^{(15)} = p_1^{(15)}.$$

The remaining submatrices are m-by-10 nonnegative real matrices and we write each of them as $$P^{(j)} = [p_1^{(j)} p_2^{(j)} \ldots p_{10}^{(j)}], j \neq 1, 8, 15, \quad (11)$$

where each $p_k^{(j)}$, $k=1,2,\ldots,10$, is a column vector of length m. For reasonable levels of blur $\sigma$ in the Gaussian kernel, the forward map P inherits an almost block-diagonal structure from D, as illustrated as bar code forward map 64 of FIG. 5. In the limit as $\sigma \to 0$, the forward map P becomes exactly block-diagonal.

Recall the oversampling rate $r = m/n$ which indicates the number of time samples per minimal bar code width. Let us partition the rows of P into 15 blocks, each block with index set $I_j$ whose size is denoted by $|I_j|$. Because of $P^{(1)}$ and $P^{(15)}$ correspond to the signal from 3 bars (black-white-black), we set $|I_1| = |I_{15}| = 3r$. The submatrix $P^{(8)}$ corresponds to the signal from 5 bars so $|I_8| = 5r$. The other submatrices correspond to signals from the various digits of length 7 bars, therefore $|I_j| = 7r$ for $j \neq 1, 8, 15$.

For small values of $\sigma$, the matrix P is nearly block diagonal, such as bar code forward map 64. We specify and quantify this nearness to being block diagonal. We use the notation $$[m] = \{1, 2, \ldots, m\}.$$

1. Most of the energy of $P_k^{(j)}$ is concentrated in the index set $I_j$. This property is captured by the inequality $$\left\| P_k^{(j)} \big|_{[m] \setminus I_j} \right\|_1 < \epsilon, \text{ for all } j \in [15], \ k \in [10], \quad (12)$$

2. Next the energy of $P_1^{(j)}$ is small outside of the index set $I_j$. For the purpose of what we wish to demonstrate, we state this mathematically as $$\left\| \left( \sum_{j'=j+1}^{15} P_{k_{j'}}^{(j')} \right) \bigg|_{I_j} \right\|_1 < \epsilon, \text{ for all } j \in [15], \quad (13)$$

and choices of $k_{j+1}, \ldots, k_{15} \in [10]$.

The second inequality has an intuitive interpretation. The magnitude of $\epsilon$ indicates to what extend the energy of each column of P is localized within its proper block.

Figure 6A:
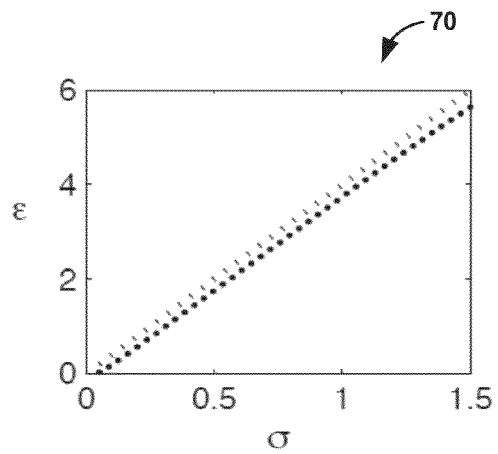
FIGS. 6A and 6B are example plots of the relationships between an oversampling ratio and a standard deviation for a forward map.
Figure 6B:
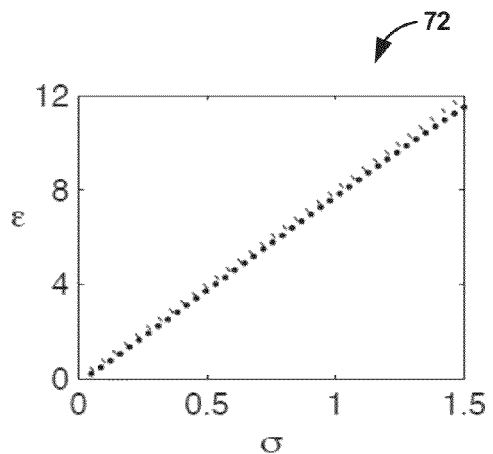

FIGS. 6A and 6B are example plots 70 and 72 of the relationships between an oversampling ratio and a standard deviation for a forward map. In FIGS. 6A and 6B, we plot as a function of $\sigma$, for oversampling rates $r=10$ (plot 70 of FIG. 6A) and $r=20$ (plot 72 of FIG. 6B), the observed minimal value of $\epsilon$ satisfying conditions (12) and (13). The thin line in each plot 70 and 72 represents $(2/5)\sigma r$. We find empirically that the value of $\epsilon$ in the forward map P depends on the parameters r and $\sigma$ according to $\epsilon = (2/5)\alpha\sigma r$. By linearity of the map with respect to $\alpha$, this implies that more generally $\epsilon = (2/5)\alpha\sigma r$.

Figure 7A:
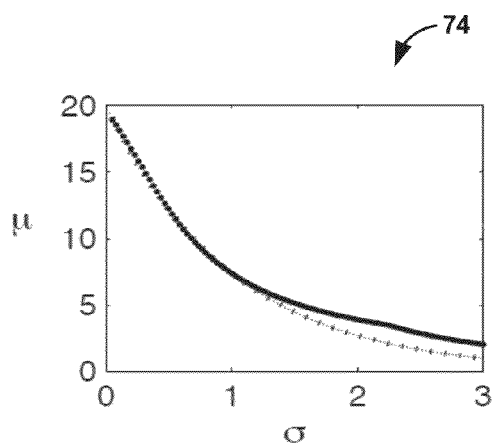
FIGS. 7A and 7B are example plots of the relationships between a standard deviation and a Gaussian kernel of a forward map.
Figure 7B:
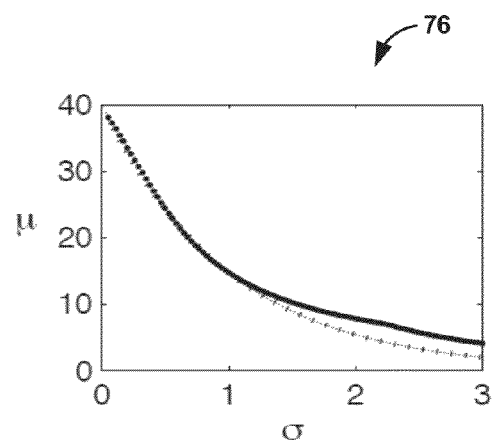

FIGS. 7A and 7B are example plots 74 and 76 of the relationships between a standard deviation and a Gaussian kernel of a forward map (goes with above). The left-integer and right-integer codes for the UPC bar code, as enumerated in Table (6), are designed to be well-separated. In other words, the bar code symbology may be such that all of the columns within a particular block are well-separated. The $l_1$-distance between any two distinct codes is greater than or equal to 2. Consequently, if $D_k$ are the columns of the bar code dictionary D, then $\min_{k1 \neq k2} \|D_{k1} - D_{k2}\|_1 = 2$. This implies for the forward map $P = \alpha G(\sigma) D$ that when there is no blur, i.e. $\sigma = 0$, then $$\mu := \min_{k_1 \neq k_2} \left\| P_{k_1}^{(j)} - P_{k_2}^{(j)} \right\|_1 = \min_{k_1 \neq k_2} \left\| P_{k_1}^{(j)} \big|_{I_j} - P_{k_2}^{(j)} \big|_{I_j} \right\|_1 = 2\alpha r, \quad (14)$$

Wherein r is the over-sampling ratio. As the blur increases from zero, $\mu = \mu(\sigma, \alpha, r)$ should decrease smoothly. In FIGS. 7A and 7B, the minimal column separation is plotted as $\mu = \min_{k1 \neq k2} \|p_k^{(j)} - p_k^{(j)}\|_1$ for the forward map $P = \alpha G(\sigma) D$ as a function of the blur parameter $\sigma$, for $\alpha = 1$ and oversampling ratios $r = 10$ (plot 74 of FIG. 7A) and $r = 20$ (plot 76 of FIG. 7B). These plots suggest that $\mu \approx 2\alpha r e^{-\sigma}$ for $\sigma \leq 1$.

From the bar code determination of problem (9) that without additive noise, the observed data, d, is the sum of 15 columns from P, one column from each $P^{(j)}$. Therefore, based on this observation, we will employ a greedy algorithm, repeatedly choosing one column from every $P^{(j)}$ submatrix by selecting the column which minimizes the norm of the data remaining after the column is subtracted. In other words, a reconstruction algorithm can be used to select the column from successive blocks to minimize the norm of the data remaining after the column is subtracted. Such an algorithm is described in pseudo-code as follows.

---
Algorithm 1: Recover Bar Code initialize:
  for $l = 1, 62, 123, x_l = 1$
  else $x_l = 0$
  $\delta \leftarrow d$
for $j = 2 : 7, 9 : 14$
  $k_{min} = \arg\min_k \|\delta - p_k^{(j)}\|_1$
  if $j \leq 7, l \leftarrow 1 + 10(j - 2) + k_{min}$
  else $l \leftarrow 62 + 10(j - 9) + k_{min}$
  $x_l \leftarrow 1$
  $r \leftarrow \delta - p_{k_{min}}^{(j)}$
end
---

Algorithm 1 may recover the bar code one digit at a time by iteratively scanning through the observed data (e.g., the acquired signal). The runtime complexity of the method may be dominated by the 12 calculations of $k_{min}$ performed by the algorithm's single loop over the course of its execution. Each one of these calculations of $k_{min}$ may consist of 10 computations of the $l_1$-norm of a vector of length $m^3$. Thus, the runtime complexity of the algorithm may be O(m).

Recall that the unknown 12-digits are represented in the unknown bar code c by the sparce vector x in c=Dx. We already know that $x_1 = x_{62} = x_{123} = 1$ as these elements corresponds to the mandatory start, middle, and end sequences. This version of the algorithm assumes that P is known, i.e., $\sigma$ is known and that $\alpha = 1$. The greedy algorithm will reconstruct the correct bar code from noisy data d=Px+h as long as P is sufficiently block-diagonal and if its columns are sufficiently incoherent. In the next section we will consider the case where $\sigma$ and $\alpha$ are unknown.

Given these assumptions we can easily prove the following result.

Theorem 1 Suppose $l_1, \ldots, l_{15} \subset [m]$ and $\epsilon \in \mathbb{R}$ satisfy the conditions (12)-(13). Then, Algorithm 1 will correctly recover a bar code signal x given noisy data d=Px+h provided that $$\left\| P_{k_1}^{(j)} \big|_{I_j} - P_{k_2}^{(j)} \big|_{I_j} \right\|_1 > 2(\|h|_{I_j}\| + 2\varepsilon) \quad (15)$$

for all $j \in [15]$ and $k_1, k_2 \in [10]$ with $k_1 \neq k_2$
Proof:
Suppose that $$d = Px + h = \sum_{j=1}^{15} p_{k_j}^{(j)} + h.$$

Furthermore, denoting $k_j = k_{min}$ in the for-loop in Algorithm 1 and suppose that $k_2, \ldots, k_{j'-1}$ have already been correctly recovered. Thus, the residual data, r, at this stage of the algorithm will be $$\delta = p_{k_j}^{(j')} + \delta_{j'} + h,$$

where $\delta_{j'}$ is defined to be $$\delta_{j'} = \sum_{j=j'+1}^{15} p_{k_j}^{(j')}.$$

We will now show that the j'th execution of the for-loop will correctly recover $p_{k_{j'}}^{(j')}$, thereby establishing the desired result by induction.

Suppose that the j'th execution of the for-loop incorrectly recovers $k_{err} \neq k_{j'}$. This happens if $$\|\delta - P_{K_{err}}^{(j')}\|_1 \leq \|\delta - P_{k_{j'}}^{(j')}\|_1.$$

In other words, we have that $$\left\| \delta - P_{k_{err}}^{(j')} \right\|_1 = \left\| \delta \big|_{I_{j'}} - P_{k_{err}}^{(j')} \big|_{I_{j'}} \right\|_1 + \left\| \delta \big|_{I_{j'}^c} - P_{k_{err}}^{(j')} \big|_{I_{j'}^c} \right\|_1 \geq$$

$$\left\| P_{k_{j'}}^{(j')} \big|_{I_{j'}} - P_{k_{err}}^{(j')} \big|_{I_{j'}} \right\|_1 - \left\| \delta_{j'} \big|_{I_{j'}} \right\|_1 - \left\| h \big|_{I_{j'}} \right\|_1 +$$

$$\left\| \delta_{j'} \big|_{I_{j'}^c} - h \big|_{I_{j'}^c} \right\|_1 - \left\| P_{k'j}^{(j')} \big|_{I_{j'}^c} \right\|_1 - \left\| P_{k_{err}}^{(j')} \big|_{I_{j'}^c} \right\|_1 \geq$$

$$\left\| P_{k_{j'}}^{(j')} \big|_{I_{j'}} - P_{k_{err}}^{(j')} \big|_{I_{j'}} \right\|_1 + \left\| \delta_{j'} \big|_{I_{j'}} + h \big|_{I_{j'}^c} \right\|_1 - \left\| h \big|_{I_{j'}} \right\|_1 - 3\varepsilon$$

from conditions (12) and (13). To finish, we simply simultaneously add and subtract $\|\delta_{j'}|_{I_{j'}} + h|_{I_{j'}}\|_1$ from the last expression to arrive at a contradiction to the supposition that $k_{err} \neq k_{j'}$:

$$\left\| \delta - P_{k_{err}}^{(j')} \right\|_1 \geq \left( \left\| P_{k_{j'}}^{(j')} \big|_{I_{j'}} - P_{k_{err}}^{(j')} \big|_{I_{j'}} \right\|_1 - 2\|h|_{I_{j'}}\|_1 - 4\varepsilon \right) + \|\delta_{j'} + h\|_1 = \quad (16)$$

$$\left( \left\| P_{k_{j'}}^{(j')} \big|_{I_{j'}} - P_{k_{err}}^{(j')} \big|_{I_{j'}} \right\|_1 - 2\|h|_{I_{j'}}\|_1 - 4\varepsilon \right) + \left\| \delta + P_{k_{j'}}^{(j')} \right\|_1 >$$

$$\left\| \delta - P_{k_{j'}}^{(j')} \right\|_1.$$

Using the empirical relationships $\epsilon = (2/5) \alpha \sigma r$ and $\mu \approx 2\alpha r e^{-\sigma}$, the condition (15) is bounded by $$\min_{j, k_1 \neq k_2} \left\| P_{k_1}^{(j)} \big|_{I_j} - P_{k_2}^{(j)} \big|_{I_j} \right\|_1 \geq \min_{j, k_1 \neq k_2} \left\| P_{k_1}^{(j)} - P_{k_2}^{(j)} \right\|_1 - 2\epsilon =$$

$$2\alpha r e^{-\sigma} - (4/5)\alpha r \sigma,$$

we arrive via (14) at an upper bound on the tolerance on the allowed noise for successful recovery in the greedy algorithm as $$\max_{j \in [12]} \left\| h \big|_{I_j} \right\|_1 \leq \alpha r (e^{-\sigma} - (6/5)\sigma). \tag{17}$$

In practice the width $2\sqrt{2\ln(2)}\sigma$ of the Gaussian blur is on the order of the minimum width of the bar code; as we assume the minimum width of the bard code is 1, this corresponds to $\sigma \approx 0.425$, and in this case the greedy algorithm can tolerate a level of noise up to $$\max_{j \in [12]} \left\| h \big|_{I_j} \right\|_1 \leq .144 \alpha r. \tag{18}$$

In practice it may be beneficial to iteratively apply Algorithm 1 several times, each time changing the order in which the digits are decoded. For example, if the distribution of h is known in advance, it might help to begin recovery by first decoding digits that are primarily supported in regions of the bar code likely to have less noise.

In the previous section it was assumed that the Gaussian convolution matrix, $\alpha G(\sigma)$, was known. In fact, this is generally not the case. In practice both $\sigma$ and $\alpha$ must be estimated since they depend on the distance from the scanner to the bar code, the reflectivity of the scanned surface, the ambient light, etc. Ultimately this means that Algorithm 1 will be decoding bar codes using only an approximation to $\alpha G(\sigma)$, and not the true matrix itself.

We will first describe a procedure for approximating the scaling factor $\alpha$ from the data when $\hat{\sigma}$ is used as an approximation for $\sigma$, we consider the matrix $G(\hat{\sigma})$ and we describe a procedure for approximating the scaling factor $\alpha$ from this approximation.

Our inverse problem reads $$d = \alpha \mathcal{G}(\sigma)\mathcal{D}x + h \tag{19}$$
$$= \alpha \mathcal{G}(\hat{\sigma})\mathcal{D}x + (h + \alpha(\mathcal{G}(\sigma) - \mathcal{G}(\hat{\sigma}))\mathcal{D}x)$$
$$= \alpha \mathcal{G}(\hat{\sigma})\mathcal{D}x + h'_i$$

That is we have incorporated the error incurred by $\hat{\sigma}$ into the additive noise vector h'. Note that the middle portion of the observed data $d_{mid} = d \big|_{I_8}$ of length 5r represents a blurry image of the known middle pattern M=[01010]. Let $\mathcal{P} = \mathcal{G}(\hat{\sigma})\mathcal{D}$ be the forward map generated by and $\alpha=1$, and consider the sub-matrix $$p_{mid} = P^{(8)} \big|_{I_8}$$

which is a vector of length 5r. If $\hat{\sigma} = \sigma$ then we can estimate a via the least squares estimate $$\hat{\alpha} = \arg\min_\alpha \|\alpha p_{mid} - d_{mid}\|_2 = p_{mid}^T d_{mid} / \|p_{mid}\|_2^2. \tag{20}$$

If $\hat{\sigma} \approx \sigma$ and the magnitude of the scanning noise, h, is small, we expect $\hat{\alpha} \approx \alpha$.[4] Dividing both sides of the equation (19) by $\hat{\alpha}$, the inverse problem becomes $$\frac{d}{\hat{\alpha}} = \frac{\alpha}{\hat{\alpha}} \mathcal{G}(\hat{\sigma})\mathcal{D}x + \frac{1}{\hat{\alpha}} h'. \tag{21}$$

Suppose that $1-\gamma \leq \alpha/\hat{\alpha} \leq 1+\gamma$ for some $0 < \gamma < 1$. Then, fixing the data to be $\hat{d} = d/\hat{\alpha}$ and fixing the forward map to be $\rho = \mathcal{G}(\hat{\sigma})\mathcal{D}$, we claim that the conditions for the greedy algorithm to recover the correct bar code become 1. $\left\| P_k^{(j)} \big|_{[m] \setminus I_j} \right\|_1 < \frac{\epsilon}{1+\gamma}$ for all $j \in [15]$ and $k \in [10]$.

2. $\left\| \left( \sum_{j'=j+1}^{15} P_{k_{j'}}^{(j')} \right) \big|_{I_j} \right\|_1 < \frac{\epsilon}{1+\gamma}$ for all $j \in [14]$ and $k_{j'} \in [10]$.

3. $\left\| P_{k_1}^{(j)} \big|_{I_j} - P_{k_2}^{(j)} \big|_{I_j} \right\|_1 > 2\left( \frac{1}{\alpha} \|h|_{I_j}\|_1 + \|(G(\sigma) - G(\hat{\sigma}))Dx|_{I_j}\|_1 + \frac{2\epsilon}{1-\gamma} \right)$ Consequently, if $\sigma \approx \hat{\sigma}$ and $1 \leq \alpha \leq \hat{\alpha}$, then the conditions for correct recovery of the bar code do not change much.

We have already indicated that one way to estimate the scaling $\alpha$ is to guess a value for $\sigma$ and perform a least-squares fit of the observed data. We now study the sensitivity of the entire recovery process with respect to $\sigma$ is proportional to the quantity $$\|(G(\sigma) - G(\hat{\sigma}))Dx|_{I_j}\|_1 \tag{22}$$

in the third condition above. Note that all the entries of the matrix $(\mathcal{G}(\sigma) - \mathcal{G}(\hat{\sigma}))$ will be small whenever $\sigma \approx \hat{\sigma}$. Thus Algorithm 1 should be able to tolerate small parameter estimation errors as long as the "almost" block diagonal matrix formed using $\hat{\sigma}$ exhibits a sizeable difference between any two of its digit columns which might (approximately) appear in any position of a given UPC bar code.

To get a sense of the size of the first term, we further investigate the expressions involved. Recall that using the dictionary matrix D, a bar code sequence of 0's and 1's is given by c=Dx. When put together with the bar code function representation (3), we see that $$[\mathcal{G}(\sigma)\mathcal{D}x]_i = \int g_\sigma(t_i - t) z(t) dt,$$

where $$g_\sigma(t) = \frac{1}{\sqrt{2\pi} \sigma} \exp - \frac{t^2}{2\sigma^2}.$$

Therefore, we have $$[\mathcal{G}(\sigma)\mathcal{D}x]_i = \sum_{j=1}^n c_j \int_{j-1}^j g_\sigma(t_i - t) dt. \tag{23}$$

Now, using the definition for the cumulative distribution function for normal distributions $$\Phi(x) = \frac{1}{\sqrt{2\pi}} \int_{-\infty}^{x} e^{-t^2/2} dt,$$

we see that $$\int_{j-1}^{j} g_\sigma(t_i - t) dt = \Phi\left(\frac{t_i - j + 1}{\sigma}\right) - \Phi\left(\frac{t_i - j}{\sigma}\right).$$

We can now rewrite (23) as $$[\mathcal{G}(\sigma)\mathcal{D}x]_i = \sum_{j=1}^{n} c_j \left[\Phi\left(\frac{t_i - j + 1}{\sigma}\right) - \Phi\left(\frac{t_i - j}{\sigma}\right)\right].$$

We now isolate the term we wish to analyze $$[(\mathcal{G}(\sigma) - \mathcal{G}(\hat{\sigma}))\mathcal{D}x]_i = $$
$$\sum_{j=1}^{n} c_j \left[\Phi\left(\frac{t_i - j + 1}{\sigma}\right) - \Phi\left(\frac{t_i - j + 1}{\hat{\sigma}}\right) - \Phi\left(\frac{t_i - j}{\sigma}\right) + \Phi\left(\frac{t_i - j}{\hat{\sigma}}\right)\right]$$

We are interested in an upper bound $$|[(\mathcal{G}(\sigma) - \mathcal{G}(\hat{\sigma}))\mathcal{D}x]_i| \le \sum_{j=1}^{n} c_j \frac{\left|\Phi\left(\frac{t_i - j + 1}{\sigma}\right) - \Phi\left(\frac{t_i - j + 1}{\hat{\sigma}}\right)\right| - }{\left|\Phi\left(\frac{t_i - j}{\sigma}\right) + \Phi\left(\frac{t_i - j}{\hat{\sigma}}\right)\right|}$$

$$\le \sum_{j=1}^{n} \frac{\left|\Phi\left(\frac{t_i - j + 1}{\sigma}\right) - \Phi\left(\frac{t_i - j + 1}{\hat{\sigma}}\right)\right| + }{\left|\Phi\left(\frac{t_i - j}{\sigma}\right) - \Phi\left(\frac{t_i - j}{\hat{\sigma}}\right)\right|},$$

$$\le 2 \sum_{j=0}^{n} \left|\Phi\left(\frac{t_i - j}{\sigma}\right) - \Phi\left(\frac{t_i - j}{\hat{\sigma}}\right)\right|.$$

Suppose that $\xi = (\xi_k)$ is the vector of values $|t_i - j|$ sorted in increasing magnitude. Note that $\xi_1$ and $\xi_2$ are less than or equal to 1, while $\xi_3 \le \xi_1 + 1$, $\xi_4 \le \xi_2 + 1$, and so on. We can center the previous bound around $\xi_1$ and $\xi_2$, giving $$|[(\mathcal{G}(\sigma) - \mathcal{G}(\hat{\sigma}))\mathcal{D}x]_i| \le \qquad (24)$$
$$\sum_{j=0}^{n} \left|\Phi\left(\frac{\xi_1 + j}{\sigma}\right) - \Phi\left(\frac{\xi_1 + j}{\hat{\sigma}}\right)\right| + \left|\Phi\left(\frac{\xi_2 + j}{\sigma}\right) - \Phi\left(\frac{\xi_2 + j}{\hat{\sigma}}\right)\right|.$$

Next we simply majorize the expression $$f(x) = \Phi\left(\frac{x}{\sigma}\right) - \Phi\left(\frac{x}{\hat{\sigma}}\right).$$

To do so, we take the derivative and find the critical points, which turn out to be $$x_* = \pm \sqrt{2} \sigma \hat{\sigma} \sqrt{\frac{\log \sigma - \log \hat{\sigma}}{\sigma^2 - \hat{\sigma}^2}}.$$

Therefore, each term in the summand (23) can be bounded by $$\left|\Phi\left(\frac{\xi + j}{\sigma}\right) - \Phi\left(\frac{\xi + j}{\hat{\sigma}}\right)\right| \le \qquad (25)$$
$$\left|\Phi\left(\sqrt{2} \hat{\sigma} \sqrt{\frac{\log \sigma - \log \hat{\sigma}}{\sigma^2 - \hat{\sigma}^2}}\right) - \Phi\left(\sqrt{2} \sigma \sqrt{\frac{\log \sigma - \log \hat{\sigma}}{\sigma^2 - \hat{\sigma}^2}}\right)\right| :=$$
$$\Delta_1(\sigma, \hat{\sigma}).$$

On the other hand, the terms in the sum decrease exponentially as j increases. To see this, recall the simple bound $$1 - \Phi(x) = \frac{1}{\sqrt{2\pi}} \int_x^{\infty} e^{-t^2/2} dt \le \frac{1}{\sqrt{2\pi}} \int_x^{\infty} \frac{t}{x} e^{-t^2/2} dt = \frac{e^{-x^2/2}}{x \sqrt{2\pi}}.$$

Writing $\sigma_{max} = \max\{(\sigma, \sigma)\}$, and noting that $\Phi(x)$ is a positive, increasing function, we have for $\xi \in [0, 1)$ $$\left|\Phi\left(\frac{\xi + j}{\sigma}\right) - \Phi\left(\frac{\xi + j}{\hat{\sigma}}\right)\right| \le 1 - \Phi\left(\frac{\xi + j}{\sigma_{max}}\right) \qquad (26)$$
$$\le \frac{\sigma_{max}}{(\xi + j)\sqrt{2\pi}} e^{-(\xi + j)^2/(2\sigma_{max}^2)}$$
$$\le \frac{\sigma_{max}}{(\xi + j)\sqrt{2\pi}} e^{-(\xi + j)/(2\sigma_{max}^2)} \text{ if } j \ge 1$$
$$= \frac{\sigma_{max}}{(\xi + j)\sqrt{2\pi}} \left(e^{-(2\sigma_{max}^2)^{-1}}\right)^{\xi + j}$$
$$\le \frac{\sigma_{max}}{j\sqrt{2\pi}} \left(e^{-(2\sigma_{max}^2)^{-1}}\right)^{j}$$
$$:= \Delta_2(\sigma_{max}, j).$$

Combining the bounds (25) and (26).

$$\left|\Phi\left(\frac{\xi + j}{\sigma}\right) - \Phi\left(\frac{\xi + j}{\hat{\sigma}}\right)\right| \le \min(\Delta_1(\sigma, \hat{\sigma}), \Delta_2(\sigma_{max}, j)).$$

Suppose that $j_1$ is the smallest integer in absolute value such that $\Delta_2(\sigma_{max}, j_1) \le \Delta_1(\sigma, \hat{\sigma})$. Then from this term on, the summands in (23) can be bounded by a geometric series:

$$\sum_{j \ge j_1}^{n} \left|\Phi\left(\frac{\xi + j}{\sigma}\right) - \Phi\left(\frac{\xi + j}{\hat{\sigma}}\right)\right| \le \frac{2\sigma_{max}}{j_1 \sqrt{2\pi}} \sum_{j \ge j_1} a^j, \quad a = e^{-(2\sigma_{max}^2)^{-1}}$$
$$\le \frac{2\sigma_{max}}{j_1 \sqrt{2\pi}} \cdot a^{j_1} (1 - a)^{-1}.$$

We then arrive at the bound $$|[(\mathcal{G}(\sigma) - \mathcal{G}(\hat{\sigma}))\mathcal{D}x]_i| \le 2 \cdot j_1 \Delta_1(\sigma, \hat{\sigma}) + \frac{4\sigma_{max} \cdot a^{j_1}(1-a)^{-1}}{j_1\sqrt{2\pi}} \quad (27)$$

$$=: B(\sigma, \hat{\sigma}).$$

The term in question on the right-hand side of (22) can then be bounded according to $$\|\mathcal{G}(\sigma) - \mathcal{G}(\hat{\sigma}))\mathcal{D}x|_{I_j}\|_1 \le |I_j| B(\sigma, \hat{\sigma}) \le 7rB(\sigma, \hat{\sigma}), \quad (28)$$

Recall that r=m/n is the sampling rate.

Recall that in practice the width $2\sqrt{2\ln(2)}\sigma$ of the Gaussian blur is on the order of 1, the minimum width of the bar code; this width corresponds to σ≈0.425. Below, we compute the bound B(σ,σ̂) for σ=0.425 and several values of σ.

| σ̂ | 0.2 | 0.4 | .5 | 0.6 | .8 |
|---|---|---|---|---|---|
| B(.425, σ̂) | .3453 | .0651 | .1608 | .3071 | .589 |

While this bound in (28) is very rough, note at least that the tabulated error bounds incurred by inaccurate σ are consistent with the level of noise that is tolerable for the greedy algorithm.

We also illustrate with numerical examples the robustness of the greedy algorithm to signal noise and imprecision in the α and σ parameter estimates. We assume that neither α nor σ is known a priori, but that we have an estimate σ̂ for σ. We then compute an estimate α̂ from σ̂ by solving the least-squares problem (20).

Figure 8A:
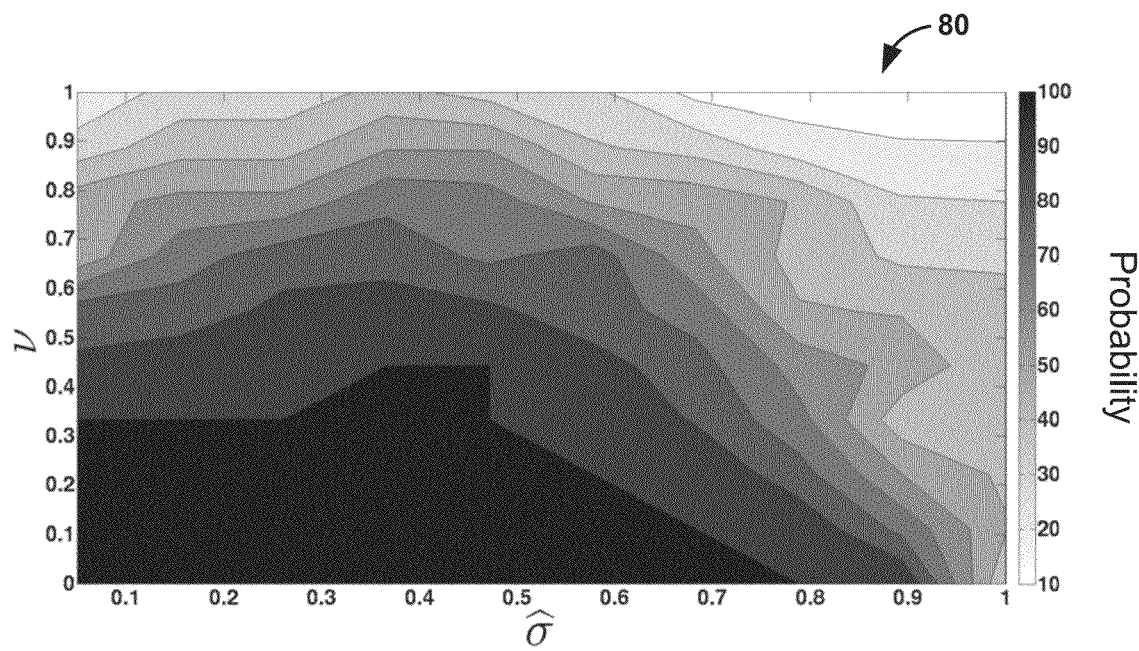
FIGS. 8A and 8B are example graphs of recovery probabilities for correctly recovering a randomly selected bar code as a function of a relative signal-to-noise ratio and standard deviation estimate.
Figure 8B:
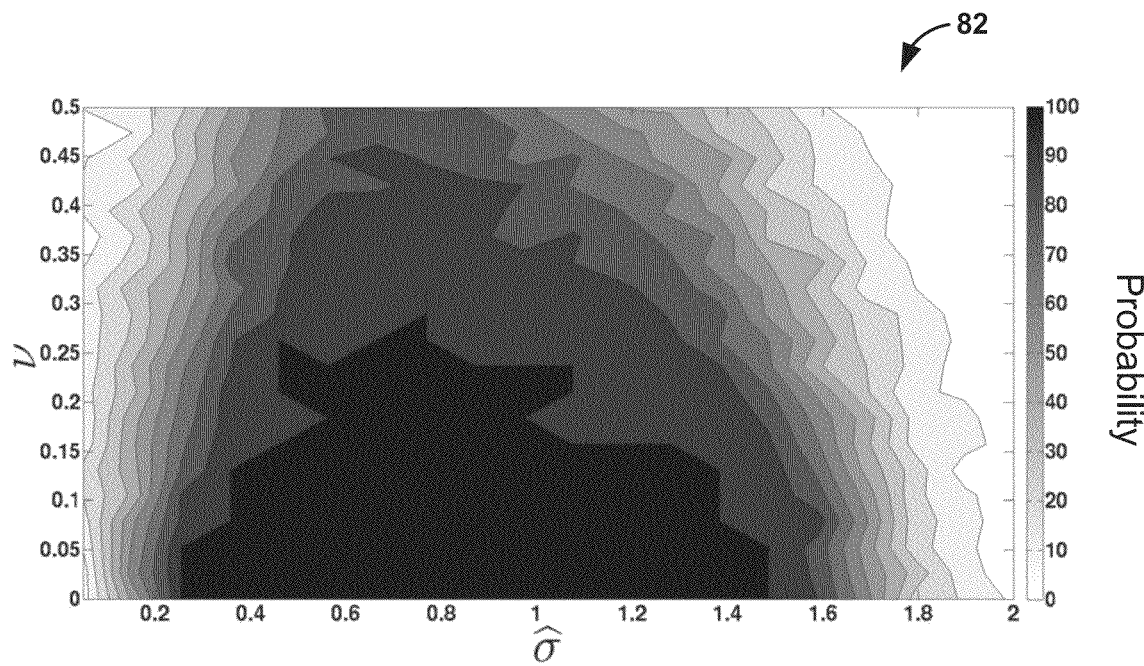

The phase diagrams in FIGS. 8A, 8B, 9A, 9B, 10A, and 10B illustrate how the reconstruction capabilities of the greedy algorithm depend on the estimate of σ and on the signal noise level. FIGS. 8A and 8B are example phase diagrams 80 and 82 of recovery probabilities for correctly recovering a randomly selected bar code as a function of a relative signal-to-noise ratio and standard deviation estimate. FIGS. 8A and 8B also demonstrate the insensitivity of the greedy algorithm to relatively large amounts of noise. Phase diagrams 80 and 82 were constructed by executing a greedy recovery approach along the lines of Algorithm 1 on may trial input signals of the forms d=α $\mathcal{G}$(σ) $\mathcal{D}$x+h where h is a mean zero Gaussian noise. More specifically, each trial signal, d, was formed as follows. First, a 12 digit number was generated uniformly at random, and its associated blurred bar code, αG(σ)Dx, was formed using the oversampling ration r=m/n=10. Second, a noise vector n, with independent and identically distributed $n_j \sim \mathcal{N}(0,1)$, was generated and then rescaled to form the additive noise vector h=v‖α $\mathcal{G}$(σ) $\mathcal{D}$x‖₂(n/‖n‖₂). Hence, the parameter $$V = \frac{\|h\|_2}{\|\alpha \mathcal{G}(\sigma)\mathcal{D}x\|_2}$$

represents the noise-to-signal ration of each trial input signal d.

In laser-based scanners, there may be two major sources of noise. First is electronic noise. Second, the roughness of the paper also causes speckle noise. In these numerical experiments, however, the numerically generated Gaussian noise was used, which may be sufficient for the purpose of decoding optical codes.

To create phase diagrams 80 and 82 of FIGS. 8A and 8B, the greedy recover algorithm, part of the decoding model, was run on 100 independently generated trial input signals for each of at least 100 equally spaced (σ̂, ρ) grid points (a 10×10 mesh was used for FIG. 8A and a 20×20 mesh for FIG. 8B). The recovery probabilities were determined for α=1 and two true σ settings. In FIGS. 8A and 8B, σ was set to 0.45 and 0.75, respectively. The shade in each phase diagrams 80 and 82 corresponds to the probability that the greedy algorithm will correctly recover a randomly selected bar code, as a function of the relative noise-to-signal level and the estimate of the standard deviation. Black represents a correct bar code recovery with a probability of 1, while white represents a recovery probability of 0. Each data point's shade, or probability estimate, may be based on 100 random trials.

The number of times the greedy algorithm successfully recovered the original UPC bar code determined the color of each region in the (σ̂, v)-plane. The black regions in phase diagrams 80 and 82 indicate regions of parameter values where all 100 of the 100 randomly generated bar codes were correctly reconstructed. The pure white parameter regions indicate where the greedy algorithm failed to correctly reconstruct any of the 100 randomly generated bar codes.

FIGS. 8A and 8B indicate that the greedy algorithm appears to be highly robust to additive noise. For example, when the σ estimate is accurate (i.e., when σ̂≈σ) we can see that the algorithm can tolerate additive noise with Euclidian norm as high as 0.25‖α $\mathcal{G}$(σ) $\mathcal{D}$x‖₂. Furthermore, as σ̂ becomes less accurate the greedy algorithm's accuracy appears to degrade smoothly.

FIGS. 9A-B and 10A-B are example phase diagrams of recovery probabilities for correctly recovering a randomly selected bar code as a function of an additive standard deviation and a standard deviation estimate under different multiplier values. Phase diagrams 84, 86, 88, and 90 of FIGS. 9A-9B and 10A-10B illustrate how the reconstruction capabilities of the greedy algorithm depend on σ, α, the estimate of σ, and on the signal noise level. We consider Gaussian additive noise on the signal, i.e. we consider the inverse problem d=α $\mathcal{G}$ (σ) $\mathcal{D}$x+h, with independent and identically distributed $h_j \sim \mathcal{N}(0, \xi^2)$, for several noise standard deviation levels ξ∈[0; 0.63]. Note that $\mathbb{E}(h|_{I_j}\|_1) = 7r\xi\sqrt{2/\pi}$. Each phase diagram corresponds to different underlying parameter values (σα), but in all diagrams we fix the oversampling ratio at r=m/n=10. The black regions in the phase diagrams indicate parameter values (σ̂, ξ) for which 100 out of 100 randomly generated bar codes were reconstructed, and white regions indicate parameter values for which 0 out of 100 randomly generated bar codes are reconstructed.

Figure 9A:
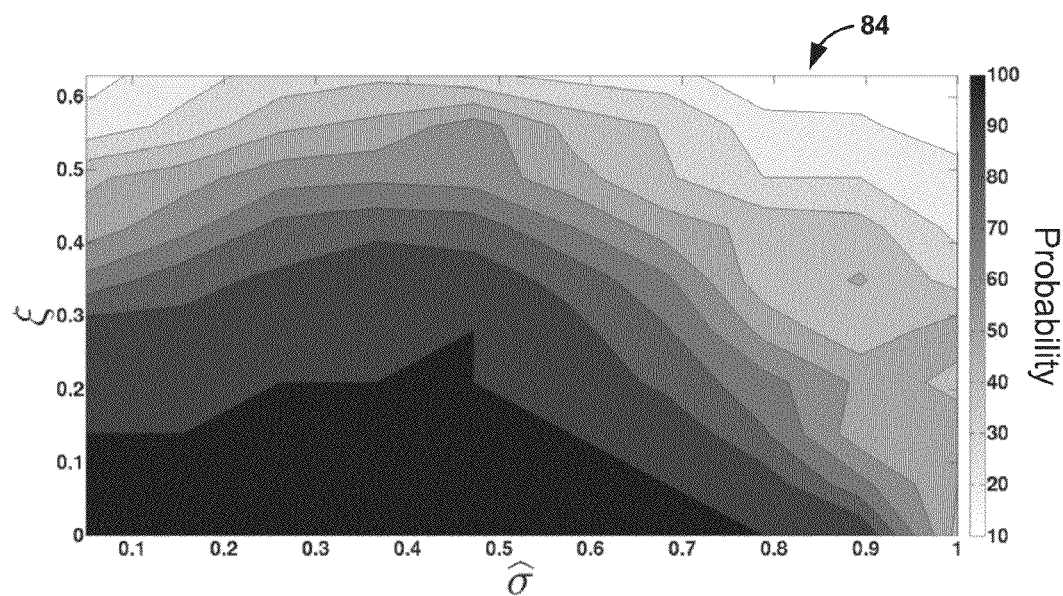
FIGS. 9A-B and 10A-B are example phase diagrams of recovery probabilities for correctly recovering a randomly selected bar code as a function of an additive standard deviation and a standard deviation estimate under different multiplier values.
Figure 9B:
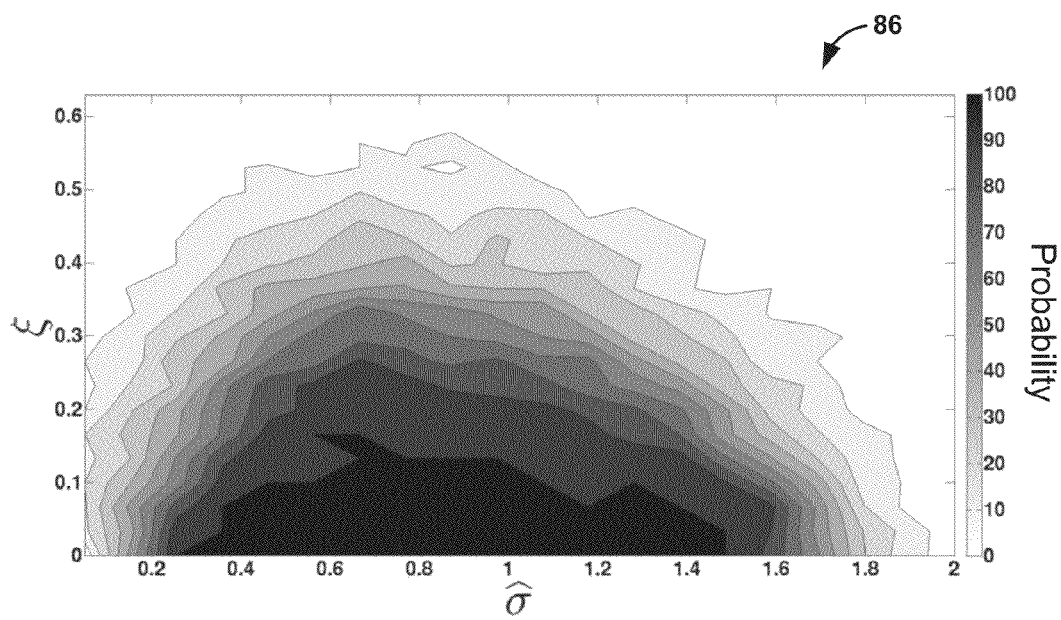
Figure 10A:
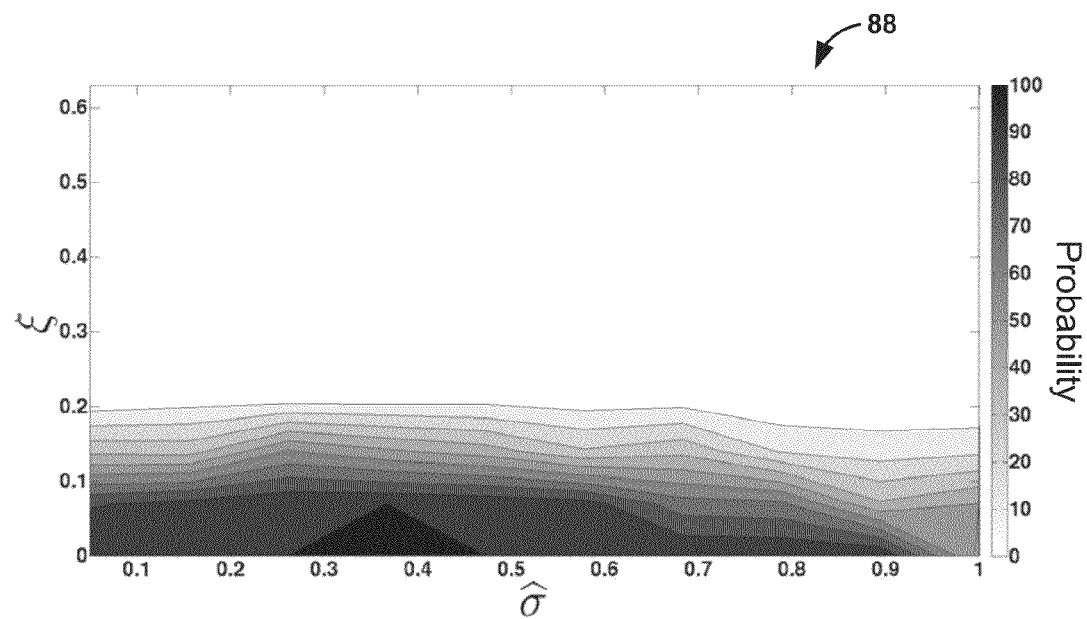
Figure 10B:
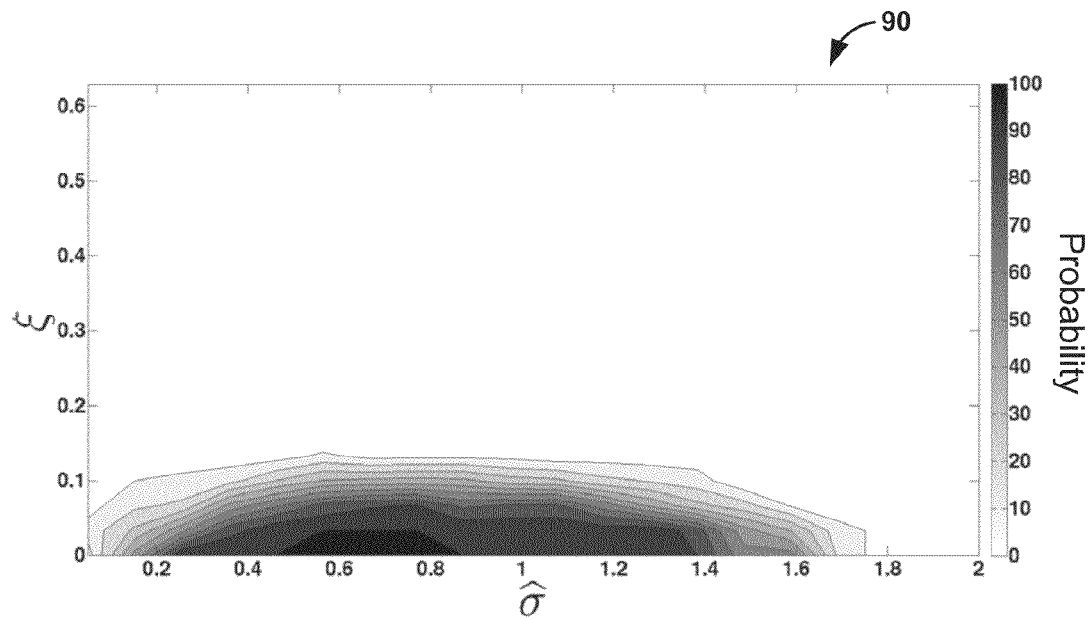

FIGS. 9A and 9B illustrate phase diagrams 84 and 86 of recovery probabilities when α=1 and for two true σ settings. In FIGS. 9A and 9B, σ was set to 0.45 and 0.75, respectively. The shade in each phase diagram 84 and 86 corresponds to the probability that the greedy algorithm will correctly recover a randomly selected bar code, as a function of the additive noise standard deviation, ξ, and the σ estimate, σ̂. Black represents a correct bar code recovery with a probability of 1, while white represents a recovery probability of 0. Each data point's shade, or probability estimate, may be based on 100 random trials. FIGS. 10A and 10B may be similar to FIGS. 9A and 9B, with α=1 and σ set to 0.45 and 0.75, respectively.

Comparing FIGS. 9A and 10B with FIGS. 9B and 10B, respectively, the greedy algorithm's performance appears to degrade with increasing σ. Increasing σ makes the forward map P=αG(σ)D less block diagonal, thereby increasing the effective value of ϵ in conditions (12) and (13). Hence, condition (17) will be less likely satisfied as σ increases. Comparisons of FIGS. 9A and 9B to FIGS. 10A and 10B also reveal the effect of α on the likelihood that the greedy algorithm correctly decodes a bar code. As α decreases from 1 to 0.25, there is a corresponding deterioration of the greedy algorithm's ability to handle additive noise of a given fixed standard deviation. This is entirely expected since α controls the magnitude of the blurred signal αG(σ)Dx. Hence, decreasing α may effectively decrease the signal-to-noise ratio of the measured input data, d, e.g., the acquired signal.

FIGS. 9A, 9B, 10A, and 10B may also demonstrate how the greedy algorithm's probability of success in recovering a randomly selected bar code varies as a function of the noise standard deviation, ξ, and the σ estimation error, |σ̂−σ|. As both the noise level and σ estimation error increase, the performance of the greedy algorithm smoothly degrades. Most importantly, the greedy algorithm may be relatively robust to inaccurate σ estimates at low noise levels. When ξ≈0, the greedy algorithm appears to suffer only a moderate decline in reconstruction rate even when |σ̂−σ|≈σ.

Figure 11A:
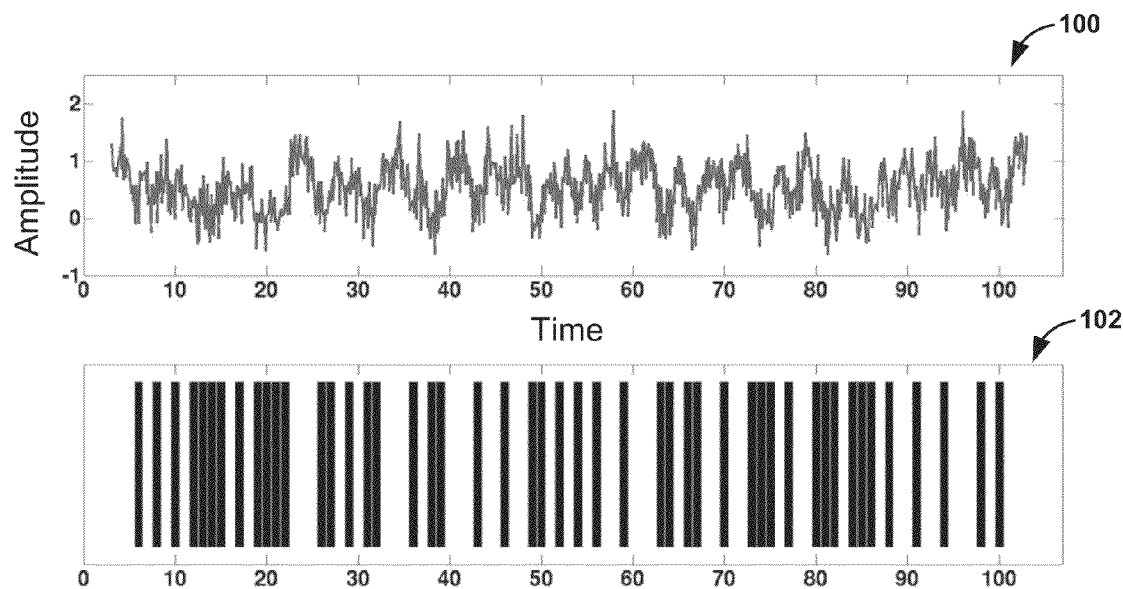
FIGS. 11A-B and 12A-12B are example signals of measured data obtained from an optical bar code and corresponding reconstructed bar codes using the techniques herein.
Figure 11B:
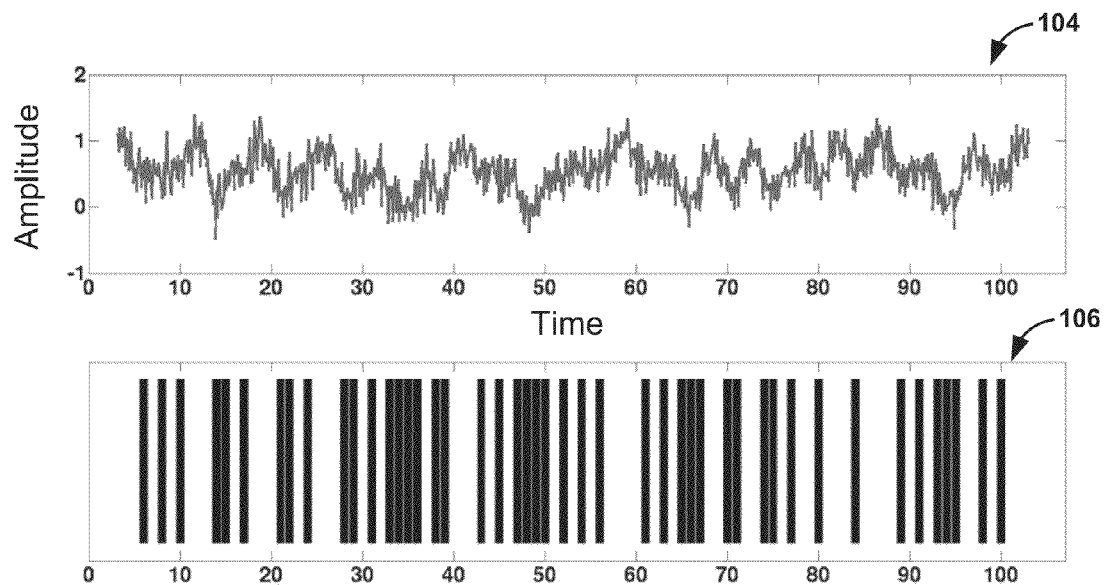

FIGS. 11A-B and 12A-12B are example signals of measured data obtained from an optical bar code and corresponding reconstructed bar codes using the techniques herein. FIGS. 11A and 11B provide examples of two bar codes 102 and 106 for which the greedy algorithm correctly recovers when α=1, one for each value of σ presented in FIGS. 8A and 8B. Bar codes 102 and 106 may be determined based on the example signals 100 and 104, respectively. In each these examples the noise stand deviation, ξ, and estimated σ value, σ̂, were chosen so that the resulting signal has parameter values which correspond to dark regions of the example's associated graphs in FIGS. 9A and 9B. Hence, these two examples represent noisy recovery problems for which the greedy algorithm correctly decodes the underlying UPC bar code with high probability.

Figure 12A:
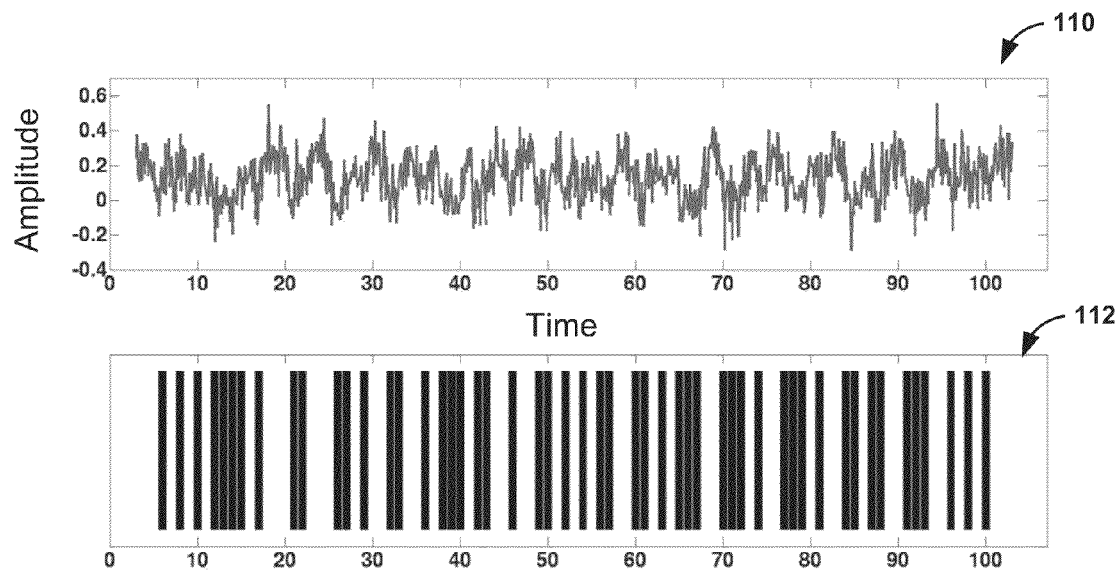
Figure 12B:
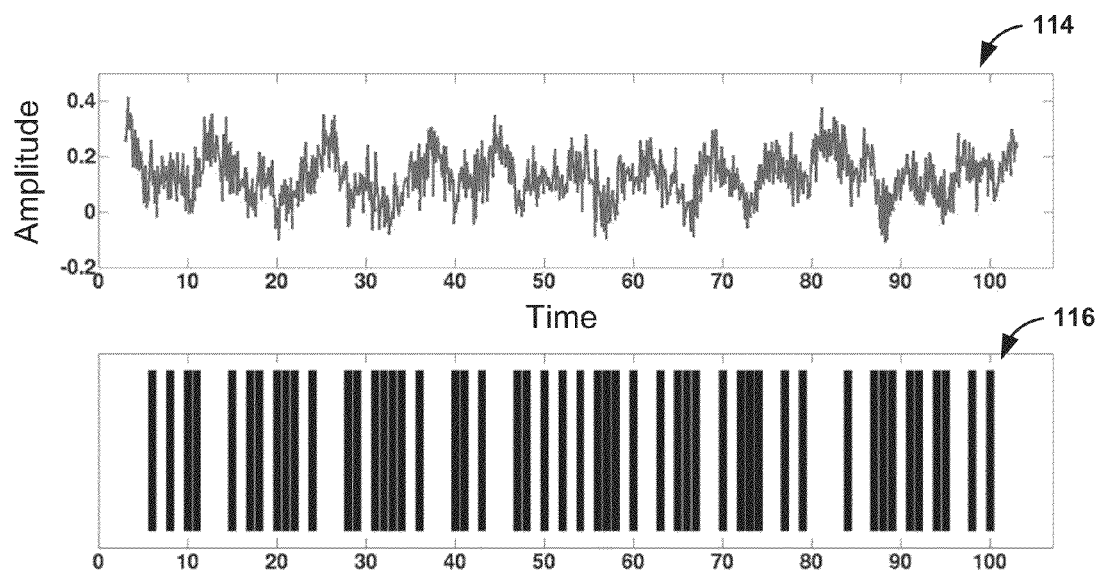

Similarly, FIGS. 12A and 12B provide two examples of two bar codes 112 and 116, respectively, which the greedy algorithm correctly recovered when α=0.25. Bar codes 112 and 116 were recovered or determined from respective signals 110 and 114. Each of these examples has parameters that correspond to a dark region in one the phase diagrams of FIGS. 9A and 9B.

In practice the σ parameter may be determined by the width of the scanning laser beam which, in turn, may be a function of both the laser's design characteristics and the laser's distance from the bar code being scanned. In applications where the scanner's distance from the bar code is fixed (e.g., in industrial applications where products on a conveyor belt are scanned by a mounted laser) it is possible to determine a good fixed estimate to the optimal σ parameter value, σ̂. In other applications where the scanners distance from the bar code may vary (e.g., with handheld scanners) other techniques for determining σ may be used. Given the robustness of the algorithm to parameter estimation errors it may be sufficient to simply fix σ̂ to be the expected optimal σ parameter value in such situations. In situations where more accuracy is required, hardware may be used to provide an estimate of the scanners distance from the bar code it is scanning, which could then be used to help produce a reasonable σ value.

In some examples, laser beam intensity profiles from a single instrument under different circumstances can be measured and can be described by a function with a few parameters. For simplicity this laser intensity profile can be modeled as a Gaussian function with a 2 parameters α and σ:

$$g(t) = \frac{\alpha}{\sqrt{2\pi}\sigma} e^{-(t^2/2\sigma^2)}.$$

Let z(x) be the bar code image function, taking on values in {0,1}. This bar code may exist in the physical space. The important factor is the relative size of the laser profile to the Gaussian in the time axis. Since this relationship is unknown, the bar code can be denoted in the time axis as z(βt) where β is an unknown scaling factor. The signal can then be modeled as a convolution of g(t) with the function z(βt). One more complication is that the time shift between the Gaussian (centered at 0) and the start of the bar code is unknown. Therefore, the signal being recorded must take the following form $$d(t)=\int g(t-\tau)=(\beta(\tau-t_0))d\tau+h(t), \qquad (30)$$

with an addition unknown shift $t_0$. The function h(t) may represent the noise. Thus in total, there are 4 unknown parameters $(\alpha, \sigma, \beta, t_0)$ which when determined from the time series data, gives us an estimate of the blur parameters, the relative size of the laser footprint to the bar code (in time domain), and the edges of the bar code in the time shift parameter $t_0$.

For a bar code, we can use the equation $$z(x) = \sum_{j=1}^{n} c_j \chi(x-(j-1)),$$

where X(x) is a characteristic function of the interval (0,1). For UPC bar codes, n=95. Moreover, we also know from the symbology of the bar code that $[c_1 c_2 c_3]=[101]$, and $[c_{93} c_{94} c_{95}]=[101]$, since the values correspond to the start and end of the bar code, and $[c_{45} c_{45} c_{46} c_{47} c_{48}]=[10101]$, corresponding to the middle of the bar code. As a step towards estimating the 4 parameters, a surrogate function $z_s(x)$ can be used with the $c_j=0$ except for those elements identified above. We can substitute $z_s(x)$ in the equation (30) and solve for the 4 parameters. Once the parameters are determined for the edge detection portion of the decoding process, the greedy algorithm can be applied to the signal to recover the bar code, as described above.

Figure 13:
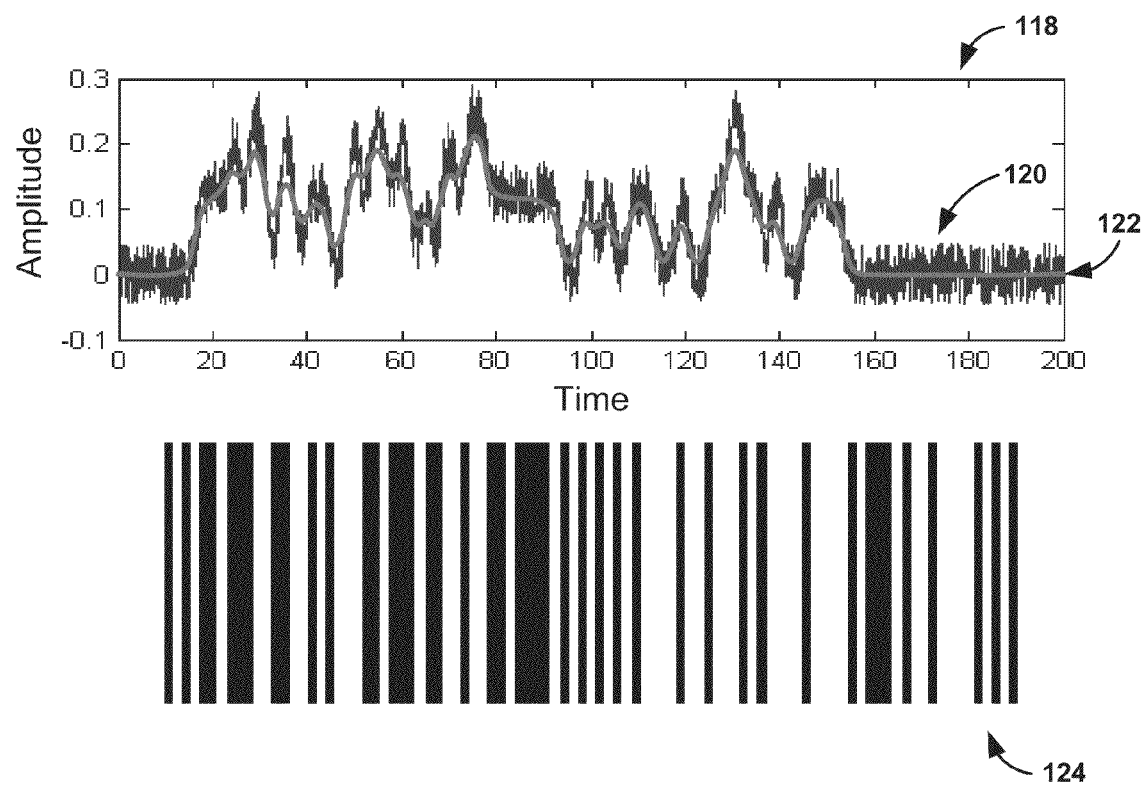
FIG. 13 is an example graph of measured data obtained from an optical bar code and a corresponding reconstructed bar code using an additional edge detection process.

An example of the application of the edge detection can be seen in FIG. 13. FIG. 13 includes example graph 118 of measured data from signal 120 obtained from an optical bar code and a corresponding reconstructed bar code 124 using an additional edge detection process with the greedy algorithm of the decoding model. Graph 118 illustrations an example time series signal 120 obtained from a laser based scanner. Using the edge detection technique first, the greedy algorithm was applied to signal 120 to recover bar code 124. Bar code 124 may be the reconstruction using the greedy algorithm after the four parameters have been estimated from the raw data during the edge detection step.

Graph 118 also includes trace 122. Trace 122 is a representation of the recovered bar code 124 to check the accuracy of the edge detection process. Once the bar code was recovered, the blur function was used with the estimated parameters and then convolved with the bar code function. The result is indicated by trace 122, and is akin to a noiseless signal that would be representative of the scanned bar code. If trace 122 matches the acquired signal 120, then the edge detection is accurately detecting the car code symbols. Computing system 14 could generate trace 122 and compare the trace to the acquired signal as an error check on the recovered optical code. If trace 122 does not correlate with signal 120, then computing system 14 may flag the recovered optical code as an error and take additional action. Computing system 14 may attempt to recover the optical code without the edge detection process, perform the edge detection process again with different parameters, or transmit a request to the user to scan the optical code again and acquire another signal representative of the optical code.

As described herein, the same approach demonstrated for the process of decoding a UPC bar code from laser scanner data can be extended to other symbologies. The only difference is the appearance of further parameters that need to be estimated from the data. Moreover, the same approach of first estimating the parameters in the decoding model and then applying a greedy algorithm of the model can be applied to the problem of decoding any optical code from a camera based scanner in other examples.

Figure 14:
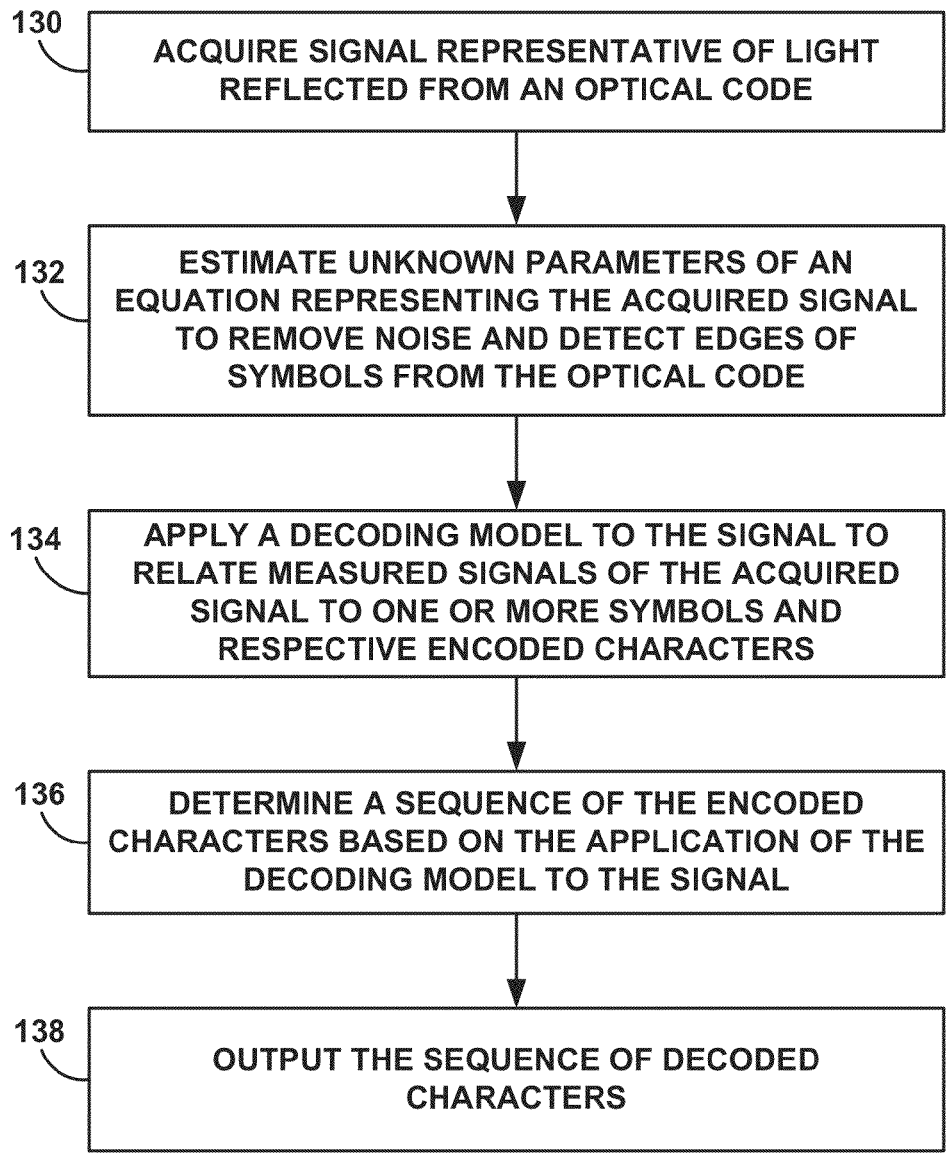
FIG. 14 is an example flow diagram of an example process for symbol-based decoding of a representation of an optical code.

FIG. 14 is an example flow diagram of an example process for symbol-based decoding of a representation of an optical code. The technique of FIG. 14 will be described with respect to decoding module 34 and computing system 12 of FIG. 2. However, processor 30 or other modules may also perform part or all of the steps described herein.

As shown in FIG. 14, decoding module 34 may acquire a signal representative of light reflected from an optical code (e.g., a bar code) (130). In some examples, optical sensor 36 may generate the signal and transmit the signal to the decoding module 34. Decoding module 34 may then perform an edge detection algorithm that detects the edges of the symbols of the optical code represented in the signal. Decoding module 34 may estimate unknown parameters of an equation representing the acquired signal to remove noise and detect edges of symbols from the optical code (132). The equation representing the acquired signal may be specific to the targeted type of optical code such that noise can be differentiated from likely edges of symbols in the optical code. In some examples, this edge detection step may not be included in the decoding process.

Next, decoding module 34 may be configured to apply a decoding model to the acquired signal to relate measured signals of the acquired signal to one or more symbols and respective encoded characters (134). For example, decoding module 34 may apply a greedy algorithm tailored to the type of optical code to fit the signal to the likely symbols represented by the signal. Decoding module 34 may apply the greedy algorithm to the signal in an iterative fashion determine the most likely symbols of a finite number of symbols that fit the acquired signal. Decoding module 34 may then be configured to determine a sequence of the encoded characters based on the application of the decoding model to the signal (136). Decoding module 34 may use an optical code dictionary, or matrix, that relates measured signals to symbols and their respective encoded characters. Although the application of the decoding model to the signal and the determination of the sequence of the encoded characters has been described as two steps in this example, the decoding process may involve a single step where the determining of the most likely symbol simply stores the associated character of that symbol.

Decoding module 34 may then output the sequence or pattern of encoded characters (now decoded characters) to a destination program or device (138). For example, decoding module 34 may transmit the encoded characters to processor 30 for further processing and determination of additional information related to the optical code. In addition, or alternatively, user interface 38 may display a representation of the sequence of characters to a user. The process of FIG. 14 may be repeated for any acquired signal from an optical code. In some examples, decoding module 34 may determine the type of optical code from with the signal was obtained. In other examples, a user may input the type of optical code is being scanned (e.g., which types of signals will be acquired by decoding module 34).

The techniques described herein may be implemented in a variety of device capable of reading an optical code such as a bar code. The symbol-based approach can be used on other symbologies including two-dimensional bar codes. Such devices may be hand-held devices or may be fixed scanners. Example scanning devices include laser-based scanners or vision-based, such as CCD or CMOS image sensors. The convolution model for the measured signal is general and can be applied to blurring due to low resolution and poor optics in camera-based devices.

In general, the techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a non-transitory computer-readable storage medium to store instructions that, when executed, performs one or more of the methods described above. The computer-readable storage medium may form part of a computer program product, which may include packaging materials. For example, the computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media.

In some examples, a computer-readable storage medium may comprise non-transitory medium. The term "non-transitory" may indicate that the storage medium is not embodied in a carrier wave or a propagated signal. In certain examples, a non-transitory storage medium may store data that can, over time, change (e.g., in RAM or cache).

The program code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structure suitable for implementation of the techniques described herein, including one or more hardware-based microprocessors.

Various embodiments of the invention have been described. These and other embodiments are within the scope of the following claims.

What is claimed is:

1. A method comprising:
   acquiring a signal representative of light reflected from an optical code comprising one or more symbols of a finite set of symbols, each of the one or more symbols of the finite set of symbols being associated with a respective encoded character and defined by a respective pattern of one or more elements in the optical code;
   fitting, by a processor, the acquired signal to a decoding model to determine a sequence of one or more of the encoded characters of the optical code from the patterns of one or more elements of the finite set of symbols and respective encoded characters represented by the decoding model when identifying the plurality of elements within the acquired signal, wherein the decoding model comprises a matrix P=αG(σ)D, G(σ) representing a Gaussian convolution matrix, a representing blur in the acquired signal, α representing a scaling factor, and D representing a bar code dictionary; and outputting, by the processor, the sequence of the one or more of the encoded characters determined from fitting the acquired signal to the decoding model.

2. The method of claim 1, wherein fitting the acquired signal to the decoding model comprises iteratively fitting, for each of the symbols of the finite set of symbols, the acquired signal to the decoding model until each portion of the acquired signal has been matched to a respective symbol.

3. The method of claim 1, wherein the decoding model comprises a lookup table that matches the acquired signal to a respective symbol of the finite set of symbols and a respective character encoded by the respective symbol.

4. The method of claim 1, wherein fitting the acquired signal to the decoding model comprises applying a greedy algorithm to the signal to identify a sequence of the encoded characters represented by the symbols of the optical code.

5. The method of claim 4, further comprising, prior to fitting the acquired signal to the decoding model, estimating unknown parameters of an equation representing the acquired signal to remove noise from the acquired signal and detect edges of the symbols of the optical code, wherein estimating unknown parameters of the equation comprises solving for the unknown parameters using an equation that represents a format of the optical code.

6. The method of claim 1, wherein the optical code is a bar code, and wherein determining the sequence of one or more of the encoded characters comprises solving the matrix P.

7. The method of claim 1, wherein the model includes a bar code dictionary as a block diagonal matrix:

$$\mathcal{D} = \begin{bmatrix} S & 0 & \cdots & & & & & & & & & & \cdots & 0 \\ 0 & L & & & & & & & & & & & & \vdots \\ \vdots & & L & & & & & & & & & & & \\ & & & L & & & & & & & & & & \\ & & & & L & & & & & & & & & \\ & & & & & L & & & & & & & & \\ & & & & & & L & & & & & & & \\ & & & & & & & M & & & & & & \\ & & & & & & & & R & & & & & \\ & & & & & & & & & R & & & & \\ & & & & & & & & & & R & & & \\ & & & & & & & & & & & R & & \\ & & & & & & & & & & & & R & \vdots \\ \vdots & & & & & & & & & & & & R & 0 \\ 0 & \cdots & & & & & & & & & & & \cdots & 0 & E \end{bmatrix}.$$

8. The method of claim 1, wherein fitting the acquired signal to the decoding model to the signal comprises fitting the acquired signal to the decoding model using an approximation for α G(σ).

9. The method of claim 1, further comprising generating, by an optical sensor, the signal representative of the light reflected from the optical code.

10. The method of claim 1, wherein the optical code is a bar code, and wherein each of the elements are one of a white bar or a black bar.

11. The method of claim 1, wherein the optical code is a two-dimensional optical code.

12. The method of claim 1, wherein fitting the acquired signal to the decoding model comprises selecting one of the patterns that best fits at least a portion of the acquired signal by fitting the acquired signal to the defined patterns of one or more elements.

13. The method of claim 1, wherein fitting the acquired signal to the decoding model comprises:

iteratively fitting, for each possible symbol of the optical code, the acquired signal to the pattern of one or more elements of each of the symbols of the finite set of symbols; and selecting, based on iteratively fitting the acquired signal, the best fit sequence of symbols of the finite set of symbols.

14. A computing system comprising:

a decoding module configured to:

acquire a signal representative of light reflected from an optical code comprising one or more symbols of a finite set of symbols, each of the one or more symbols of the finite set of symbols being associated with a respective encoded character and defined by a respective pattern of one or more elements in the optical code;

fit the acquired signal to a decoding model to determine a sequence of one or more of the encoded characters of the optical code from the defined patterns of one or more elements of the finite set of symbols and respective encoded characters represented by the decoding model when identifying the plurality of elements within the acquired signal, wherein the decoding model comprises a matrix P=αG(σ)D, G(σ) representing a Gaussian convolution matrix, a representing blur in the acquired signal, α representing a scaling factor, and D representing a bar code dictionary; and output the sequence of the one or more of the encoded characters determined from fitting the acquired signal to the decoding model.

15. The system of claim 14, wherein the decoding module is configured to iteratively fit, for each of the symbols of the finite set of symbols, the acquired signal to the decoding model until each portion of the acquired signal has been matched to a respective symbol.

16. The system of claim 14, wherein the decoding model comprises a lookup table that matches the acquired signal to a respective symbol of the finite set of symbols and a respective character encoded by the respective symbol.

17. The system of claim 14, wherein the decoding module is configured to apply a greedy algorithm to the signal to identify a sequence of the encoded characters represented by the symbols of the optical code.

18. The system of claim 17, wherein the decoding module is configured to:

prior to fitting the acquired signal to the decoding model, estimate unknown parameters of an equation representing the acquired signal to remove noise from the acquired signal and detect edges of the symbols of the optical code; and solve for the unknown parameters using an equation that represents a format of the optical code.

19. The system of claim 14, wherein the optical code is a bar code, and wherein the decoding module is configured to determine the sequence of one or more of the encoded characters by solving the matrix P.

20. The system of claim 14, wherein the decoding model includes a bar code dictionary as a block diagonal matrix:

$$\mathcal{D} = \begin{bmatrix} S & 0 & \cdots & & & & & & & & & & \cdots & 0 \\ 0 & L & & & & & & & & & & & & \vdots \\ \vdots & & L & & & & & & & & & & & \\ & & & L & & & & & & & & & & \\ & & & & L & & & & & & & & & \\ & & & & & L & & & & & & & & \\ & & & & & & L & & & & & & & \\ & & & & & & & M & & & & & & \\ & & & & & & & & R & & & & & \\ & & & & & & & & & R & & & & \\ & & & & & & & & & & R & & & \\ & & & & & & & & & & & R & & \\ & & & & & & & & & & & & R & \vdots \\ \vdots & & & & & & & & & & & & R & 0 \\ 0 & \cdots & & & & & & & & & & & \cdots & 0 & E \end{bmatrix}.$$

21. The system of claim 14, further comprising:
a memory configured to store the decoding model; and
a scanner configured to generate the signal representative of the light reflected by the optical code, wherein the decoding module comprises software executing on one or more processors of the system.

22. A non-transitory computer-readable storage medium comprising instructions that, when executed, cause one or more processors to:
  acquire a signal representative of light reflected from an optical code comprising one or more symbols of a finite set of symbols, each of the one or more symbols of the finite set of symbols being associated with a respective encoded character and defined by a respective pattern of one or more elements in the optical code;
  fit the acquired signal to a decoding model to determine a sequence of one or more of the encoded characters of the optical code from the defined patterns of one or more elements of the finite set of symbols and respective encoded characters represented by the decoding model when identifying the plurality of elements within the acquired signal, wherein the decoding model comprises a matrix $P=\alpha G(\sigma)D$, $G(\sigma)$ representing a Gaussian convolution matrix, $\sigma$ representing blur in the acquired signal, $\alpha$ representing a scaling factor, and D representing a bar code dictionary; and
  output the sequence of the one or more of the encoded characters determined from fitting the acquired signal to the decoding model.

* * * * *

UNITED STATES PATENT AND TRADEMARK OFFICE
CERTIFICATE OF CORRECTION

PATENT NO. : 8,967,481 B2
APPLICATION NO. : 13/624498
DATED : March 3, 2015
INVENTOR(S) : Fadil Santosa, Mark A. Iwen and Rachel A. Ward Page 1 of 1

It is certified that error appears in the above-identified patent and that said Letters Patent is hereby corrected as shown below:

Specification, Statement Regarding Federally Sponsored Research, starting in Column 1, line 11: the statement "This invention was made with government support under Agency Grant No.: 0807856 awarded by the National Science Foundation. The government has certain rights in the invention." should read as follows:

-- This invention was made with government support under DMS-0807856 awarded by the National Science Foundation. The government has certain rights in the invention. --

Signed and Sealed this
Third Day of November, 2015

Michelle K. Lee
*Director of the United States Patent and Trademark Office*